United States Patent
Kozuka et al.

(10) Patent No.: US 10,419,789 B2
(45) Date of Patent: Sep. 17, 2019

(54) INFORMATION PROCESSING METHOD, INFORMATION PROCESSOR, AND RECORDING MEDIUM

(71) Applicant: Panasonic Intellectual Property Management Co., Ltd., Osaka (JP)

(72) Inventors: Masayuki Kozuka, Osaka (JP); Masaya Yamamoto, Kyoto (JP); Kaoru Murase, Nara (JP); Tadamasa Toma, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 225 days.

(21) Appl. No.: 15/046,491

(22) Filed: Feb. 18, 2016

(65) Prior Publication Data

US 2016/0165267 A1    Jun. 9, 2016

Related U.S. Application Data

(63) Continuation of application No. PCT/JP2015/003099, filed on Jun. 22, 2015.

(Continued)

(30) Foreign Application Priority Data

May 29, 2015  (JP) .................................. 2015-110833

(51) Int. Cl.
*G06F 21/10*  (2013.01)
*H04N 21/2347*  (2011.01)
(Continued)

(52) U.S. Cl.
CPC ......... *H04N 21/2347* (2013.01); *G06F 21/10* (2013.01); *G06F 21/602* (2013.01);
(Continued)

(58) Field of Classification Search
CPC ........ G06F 21/10; G06F 21/60; G06F 21/602; G11B 20/00086; G11B 20/00188;
(Continued)

(56) References Cited

U.S. PATENT DOCUMENTS

| | | | |
|---|---|---|---|
| 2003/0154377 A1* | 8/2003 | Hirai | G06T 1/005 713/176 |
| 2004/0027393 A1* | 2/2004 | Kato | G06T 1/0021 715/838 |

(Continued)

FOREIGN PATENT DOCUMENTS

| | | |
|---|---|---|
| JP | 2008-257768 | 10/2008 |
| JP | 2012-175608 | 9/2012 |

OTHER PUBLICATIONS

International Search Report of PCT application No. PCT/JP2015/003099 dated Aug. 11, 2015.

*Primary Examiner* — Khang Do
(74) *Attorney, Agent, or Firm* — Greenblum & Bernstein, P.L.C.

(57) ABSTRACT

A method includes: holding a device key provided to an information processing terminal; reading an encrypted content and conversion control information from a recording medium; decoding the read encrypted content using the held device key to obtain a decoded content; converting the decoded content into an export format to obtain an export content; generating playback right information indicating that the information processing terminal can play back the converted export content according to the read conversion control information; and controlling whether the playback right information can be generated according to a first flag.

10 Claims, 17 Drawing Sheets

Related U.S. Application Data

(60) Provisional application No. 62/022,971, filed on Jul. 10, 2014, provisional application No. 62/027,568, filed on Jul. 22, 2014.

(51) Int. Cl.

| | | |
|---|---|---|
| *G06F 21/60* | (2013.01) | |
| *G11B 20/00* | (2006.01) | |
| *H04N 5/85* | (2006.01) | |
| *H04N 9/79* | (2006.01) | |
| *H04N 21/41* | (2011.01) | |
| *H04N 21/433* | (2011.01) | |
| *H04N 21/4405* | (2011.01) | |
| *H04N 21/4408* | (2011.01) | |
| *H04N 21/4627* | (2011.01) | |
| *H04N 21/8355* | (2011.01) | |
| *H04N 21/854* | (2011.01) | |
| *H04N 9/804* | (2006.01) | |

(52) U.S. Cl.
CPC .... *G11B 20/0021* (2013.01); *G11B 20/00086* (2013.01); *G11B 20/00188* (2013.01); *G11B 20/00731* (2013.01); *G11B 20/00855* (2013.01); *H04N 5/85* (2013.01); *H04N 9/7921* (2013.01); *H04N 21/4126* (2013.01); *H04N 21/4334* (2013.01); *H04N 21/4405* (2013.01); *H04N 21/4408* (2013.01); *H04N 21/4627* (2013.01); *H04N 21/8355* (2013.01); *H04N 21/85406* (2013.01); *H04N 9/8047* (2013.01)

(58) Field of Classification Search
CPC .......... G11B 20/0021; G11B 20/00731; G11B 20/00855; H04N 21/2347; H04N 21/4126; H04N 21/4405; H04N 21/4408; H04N 21/4627; H04N 21/85406
See application file for complete search history.

(56) References Cited

U.S. PATENT DOCUMENTS

| | | | | |
|---|---|---|---|---|
| 2005/0053238 | A1* | 3/2005 | Ripley ................ | H04N 5/913 380/202 |
| 2006/0126837 | A1* | 6/2006 | Jeon .................. | H04N 5/913 380/201 |
| 2007/0106745 | A1* | 5/2007 | Sakoh ................ | G06Q 30/0603 709/217 |
| 2007/0174570 | A1* | 7/2007 | Horii ................ | G11B 20/00086 711/163 |
| 2007/0183747 | A1* | 8/2007 | Watanabe ............ | H04N 5/76 386/257 |
| 2008/0145026 | A1* | 6/2008 | Shimada ............ | G11B 20/00086 386/239 |
| 2008/0271153 | A1* | 10/2008 | Peterka .............. | G06F 21/10 726/26 |
| 2008/0317433 | A1* | 12/2008 | Hamada ............ | G11B 27/329 386/241 |
| 2011/0010301 | A1* | 1/2011 | Tsuruga ............ | G06Q 50/184 705/310 |
| 2011/0296534 | A1* | 12/2011 | Risan ................ | G06F 21/10 726/30 |
| 2016/0094563 | A1* | 3/2016 | Arsanjani .......... | H04L 63/107 726/4 |
| 2016/0328174 | A1* | 11/2016 | Uchimura .......... | H04N 5/85 |

* cited by examiner

FIG. 16

| DATA NAME | THE NUMBER OF BITS |
|---|---|
| EPN | 1 bit |
| CCI | 2 bits |
| Export_Playable | 1 bit |
| (reserved) | 2 bits |
| Image_Constraint_Token | 1 bit |
| Digital_Only_Token | 1 bit |
| APSTB | 3 bits |

FIG. 17

| DATA NAME | THE NUMBER OF BITS |
|---|---|
| EPN | 1 bit |
| CCI | 2 bits |
| Export_Playable | 1 bit |
| Check SFF permission server | 1 bit |
| (reserved) | 1 bit |
| Image_Constraint_Token | 1 bit |
| Digital_Only_Token | 1 bit |
| APSTB | 3 bits |

INFORMATION PROCESSING METHOD, INFORMATION PROCESSOR, AND RECORDING MEDIUM

BACKGROUND

1. Technical Field

The present disclosure relates to an information processing method, an information processor, and a recording medium.

2. Description of the Related Art

A file format used in a conventional optical disk such as a DVD and a Blu-ray (registered trademark) disk is an MPEG2-TS (MPEG-2 Transport Stream) scheme defined by ISO/IEC 138181-1. A file (data), which is configured by multiplexing a video stream, an audio stream, and a subtitle stream using an MPEG2-TS scheme, is recorded in the conventional optical disk.

Specifically, when the MPEG2-TS scheme is used, the video stream, the audio stream, and the subtitle stream are multiplexed while divided into each of a plurality of 188-byte TS packets, and the video stream, the audio stream, and the subtitle stream are recorded in the optical disk. The MPEG2-TS scheme is suitable for a medium, such as broadcasting and an optical disk, in which the sequentially-read and -processed data is transmitted or recorded. Therefore, even in a consumer device having a relatively small buffer capacity, the stream can efficiently be read, decoded, and played back by the MPEG2-TS scheme.

On the other hand, recently an MP4 scheme defined by ISO/IEC 14496-12 is becoming widespread as the file format in content distribution of a network. An extremely flexible data structure is used in the MP4 scheme on the assumption that the MP4 scheme is applied to the randomly accessible medium such as an HDD (Hard Disk Drive) and a flash memory. In a general use form of the MP4 scheme, the stream such as the video stream, the audio stream, and the subtitle stream is divided into units of fragments having a several seconds, and the fragments are sequentially arrayed to form one file.

A high-quality content such as 4K is expected to become widespread from now on. It is considered that the optical disk is frequently used as the medium distributing the high-quality content from the viewpoint of a bit unit price. On the other hand, although a mobile device such as a smartphone and a tablet does not include a drive (optical disk drive) that can play back the optical disk, the mobile device is used as a content distribution receiving and playing back terminal in the network because of high portability and a large, high-definition display screen.

However, mobile devices such as a smartphone and a tablet are mainly compatible with the MP4 scheme, while few mobile devices are compatible with the MPEG2-TS scheme.

Therefore, in order to use the optical disk content in mobile devices such as a smartphone and a tablet, it is necessary to convert the file format of the content into the format that can be used by the mobile device. For example, PTL 1 discloses a technology of converting the file format of the content distributed by the optical disk from the MPEG2-TS scheme to the MP4 scheme. An MP4 scheme file (MP4 video content) is generated by a method disclosed in PTL 1.

CITATION LIST

Patent Literature

PTL 1: Unexamined Japanese Patent Publication No. 2012-175608

SUMMARY

In one general aspect, the techniques disclosed here feature a method used in an information processing terminal, including: holding a device key provided to the information processing terminal; reading the encrypted content and conversion control information from the recording medium, the conversion control information indicating a usage rule of an encrypted content being stored in a recording medium, the conversion control information including a first flag indicating whether the information processing terminal can play back an export content; decoding the read encrypted content using the held device key to obtain a decoded content; converting the decoded content into an export format to obtain the export content; generating playback right information indicating that the information processing terminal can play back the export content according to the read conversion control information; and controlling whether the playback right information can be generated according to the first flag.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

BRIEF DESCRIPTION OF THE DRAWINGS

FIG. 16 is a view illustrating an example of a detailed configuration of conversion control information in the second exemplary embodiment;

FIG. 17 is a view illustrating another example of the detailed configuration of the conversion control information in the second exemplary embodiment;

DETAILED DESCRIPTION

Figure 1:
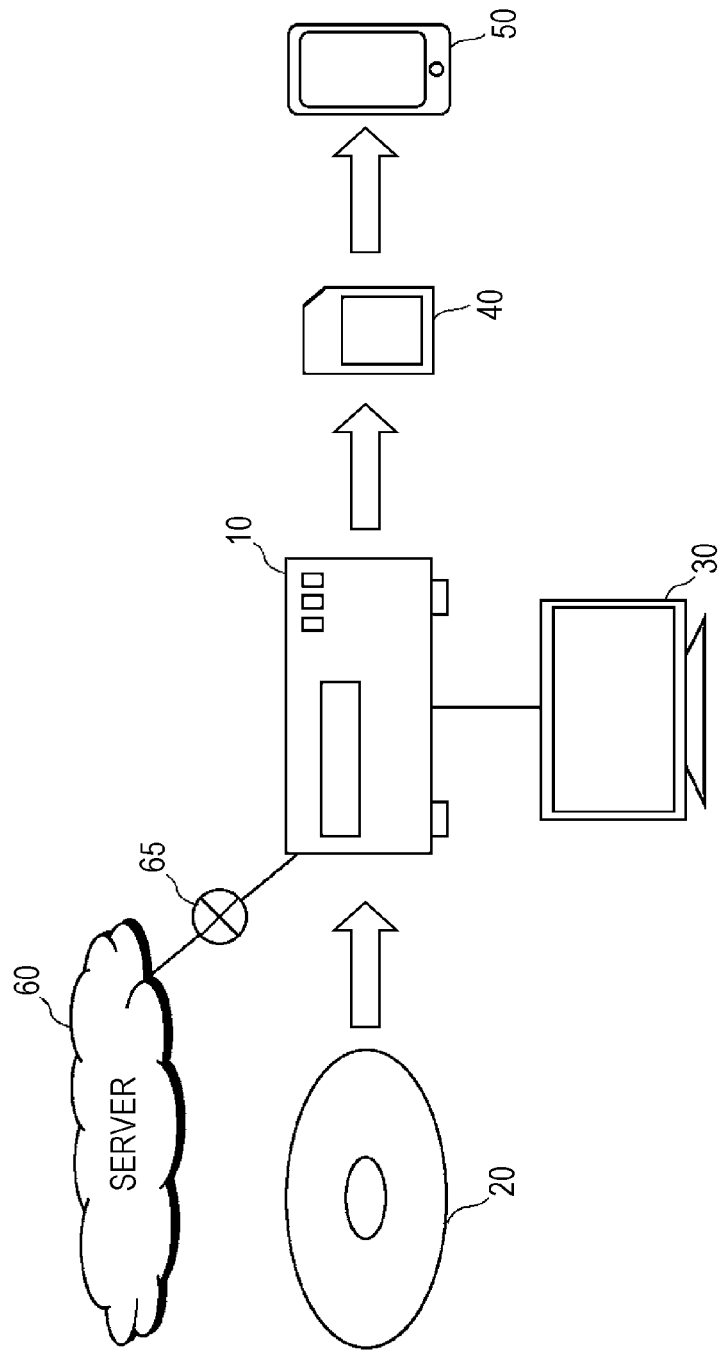
FIG. 1 is a view illustrating an entire image of a system according to a first exemplary embodiment.

Underlying Knowledge Forming Basis of the Present Disclosure

DRM (Digital Rights Management) of the content recorded in the optical disk is not considered in the method disclosed in PTL 1. For this reason, in the device in which the MPEG2-TS scheme file distributed by the optical disk is converted into the MP4 scheme, sometimes the converted MP4 scheme file cannot be played back and whether the conversion processing into the MP4 scheme file is correctly performed cannot be checked.

One non-limiting and exemplary embodiment provides an information processing method, an information processor, and a recording medium for being able to check whether the file format of the content is correctly converted.

One aspect of the present disclosure provides a method used in an information processing terminal, including: holding a device key provided to the information processing terminal; reading the encrypted content and conversion control information from the recording medium, the conversion control information indicating a usage rule of an encrypted content being stored in a recording medium, the conversion control information including a first flag indicating whether the information processing terminal can play back an export content; decoding the read encrypted content using the held device key to obtain a decoded content; converting the decoded content into an export format to obtain the export content; generating playback right information indicating that the information processing terminal can play back the export content according to the read conversion control information; and controlling whether the playback right information can be generated according to the first flag.

Therefore, whether the file format of the content is correctly converted can be checked.

The information processing method may further include the step of exporting the export content.

The first flag may be expressed by 1 bit, and defined by a data name of Export_Playable.

The information processing method may further include generating a message. At this point, for the first flag of 0 (zero), in the controlling, the control is performed such that the playback right information cannot be generated in the generating of the playback right information, and a message indicating that the information processing terminal cannot play back the export content is generated in the generating of the message.

For the first flag of 1, in the controlling, the control may be performed such that the playback right information can be generated in the generating of the playback right information, and, in the exporting, the export content and the playback right information may be exported to a mobile device or a portable storage medium.

The information processing method may further include: checking a value of the first flag held by the server when a second flag indicates that the server checks the value of the first flag, the conversion control information including the second flag indicating whether the server checks a value of the first flag; and changing the value of the first flag included in the read conversion control information to the checked value of the first flag held by the server differs from the value of the first flag included in the read conversion control information.

Additional data (data for export) that can be used in an export content may be stored in the recording medium, and, in the converting, the additional data may be converted into a manifest file in which information on the export content is described.

The information processing method may further include acquiring additional data (data for export) for the recording medium from the server existing in an external network when the additional data is not stored in the recording medium, the additional data being able to be used in the export content. At this point, in the converting, the acquired additional data is converted into meta-data used to explain the export content.

The encrypted content may be stored in an MPEG2-TS format in the recording medium, and, in the converting, an MPEG2-TS format content decoded in the decoding may be converted into the export file in an MP4 format.

Another aspect of the present disclosure provides an information processor that exports an encrypted content recorded in a recording medium, conversion control information indicating a usage rule of the encrypted content being stored in the recording medium, the conversion control information including a first flag indicating whether the information processor can play back an export content, the information processor including: a device key holder that holds a device key provided to the information processor; a reader that reads the encrypted content and the conversion control information from the recording medium; a decoder that decodes the encrypted content read by the reader using the device key held by the device key holder; a converter that converts a content decoded by the decoder into the export format to obtain the export content; a generator that generates playback right information indicating that the information processor can play back the export content converted by the converter according to the conversion control information read by the reader; and a controller that controls whether the playback right information can be generated according to the first flag.

According to still another aspect of the present disclosure, in a non-transitory computer-readable recording medium, in which an encrypted content is recorded and conversion control information indicating a usage rule of the encrypted content is stored, the conversion control information includes a flag indicating whether an export content can be played back by an information processing terminal that performs export.

These general or specific modes may be embodied by a system, a method, an integrated circuit, a computer program, or a recording medium such as a computer-readable CD-ROM, or any combination of the system, the method, the integrated circuit, the computer program, and the recording medium.

Hereinafter, an information processing method and the like according to one aspect of the present disclosure will specifically be described with reference to the drawings. The following exemplary embodiments illustrate one specific example of the present disclosure. A numerical value, a shape, a material, a component, and a disposition of the component, which are indicated in the following exemplary embodiment, are illustrated only by way of example, but do not limit the present disclosure. In the components of the following exemplary embodiments, the component that is not described in the independent claim indicating the top concept is described as an arbitrary component.

First Exemplary Embodiment (Entire Configuration of System)

FIG. 1 is a view illustrating an entire image of a system according to a first exemplary embodiment.

System 1 in FIG. 1 includes information processor 10, optical disk 20, video device 30, recording medium 40, mobile device 50, server 60, and network 65.

System 1 is an example of a digital bridge system in which, by permission of a copyright holder, the content in optical disk 20 is copied to information processor 10, recording medium 40, and mobile device 50 and enabled to be viewed by information processor 10 and mobile device 50 with no use of optical disk 20.

Information processor 10 exports the encrypted content recorded in optical disk 20. Information processor 10 converts the encrypted content recorded in optical disk 20 into that in an export format (file format), and exports the converted content to recording medium 40 and mobile device 50. Details are described later.

Optical disk 20 is a recording medium such as a Blu-ray disk and a DVD disk. For example, an MPEG2-TS scheme content (TS video content) is recorded in optical disk while encrypted.

For example, video device 30 is a television set, and the content played back by information processor 10 is displayed on video device 30.

Recording medium 40 is a portable storage medium (mobile medium) such as a USB memory and an SD memory card. In the first exemplary embodiment, the content exported from information processor 10 is recorded in recording medium 40.

Mobile device 50 is a portable information terminal, such as a smartphone and a tablet, which includes a large-size, high-definition display screen. Mobile device 50 may be connected to information processor 10 and a USB cable in a wireless or wired manner. In mobile device 50 of the first exemplary embodiment, the content in which the file format is converted is exported into a built-in memory from information processor 10 to be able to be viewed with no use of optical disk 20. In mobile device 50, the content exported from information processor 10 can be viewed with no use of optical disk 20 by inserting recording medium 40 in which the content is recorded in a slot and the like.

Network 65 is one typified by the Internet.

Server 60 is a management server or a right processing server that performs DRM (Digital Rights Management). For example, server 60 manages a copy control condition or playback right information of the content of optical disk 20. In the first exemplary embodiment, information processor 10 can be connected to server 60 through network 65.

(Information Processor)

Figure 2:
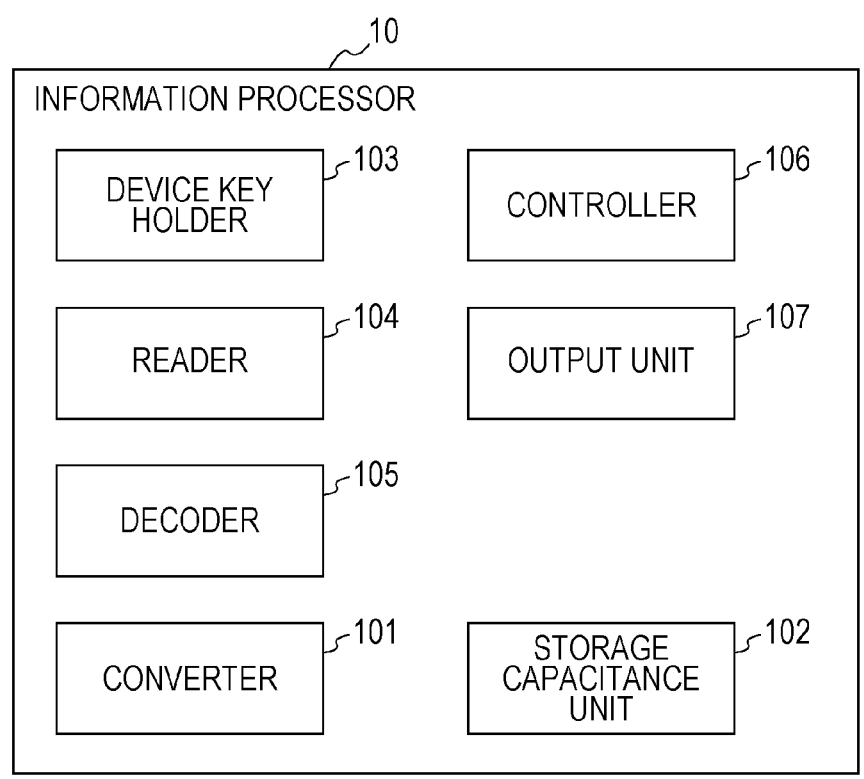
FIG. 2 is a view illustrating an example of a detailed configuration of an information processor in the first exemplary embodiment.

FIG. 2 is a view illustrating an example of a detailed configuration of the information processing device in the first exemplary embodiment.

Information processor 10 in FIG. 2 includes converter 101, storage capacitance unit 102, device key holder 103, reader 104, decoder 105, controller 106, and output unit 107.

Storage capacitance unit 102 is a detachable, portable storage device, such as a built-in HDD (Hard Disk Drive) and an external HDD, which is provided in information processor 10.

Device key holder 103 holds a device key provided to information processor 10.

Reader 104 reads the encrypted content from optical disk 20.

Using a device key held by device key holder 103, decoder 105 decodes the encrypted content read by reader 104.

Converter 101 obtains an export content by converting the content decoded by decoder 105 into that in an export format. In the following description of the first exemplary embodiment, it is assumed that the encrypted content recorded in optical disk 20 is the MPEG2-TS scheme file, and that the export content is the MP4 scheme file.

Controller 106 performs control such that information processor 10 is caused to access server 60a acting as a Blu-ray copy management server, and performs control such that information processor 10 is caused to check the copy control condition of the content in optical disk 20a.

Output unit 107 outputs (exports) the export content converted by converter 101.

A specific system configuration and the like will be described below as Examples.

Example 1

Figure 3:
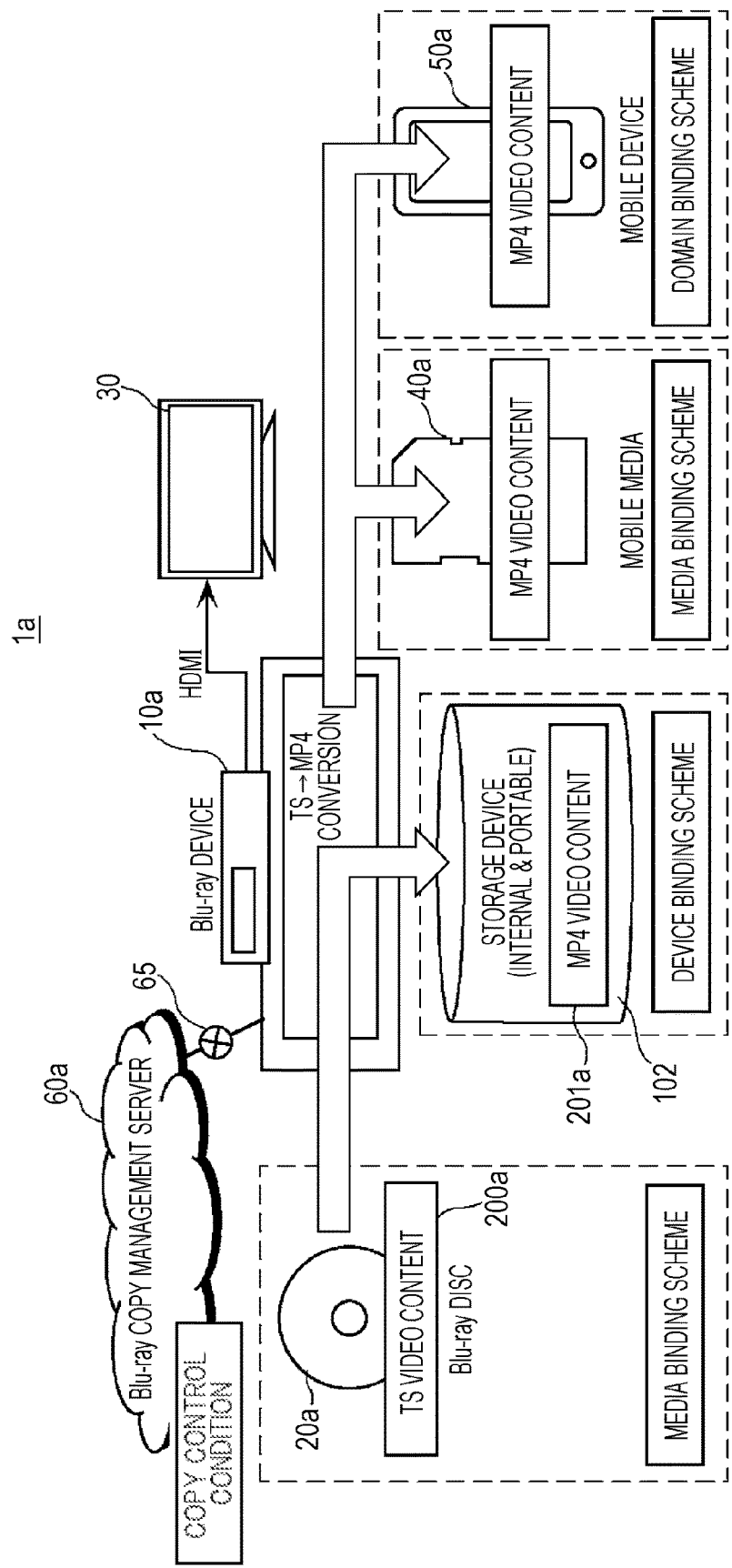
FIG. 3 is a view illustrating a system configuration example in Example 1 of the first exemplary embodiment.

FIG. 3 is a view illustrating a system configuration example in Example 1 of the first exemplary embodiment. The component similar to that in FIG. 1 is designated by the identical reference mark, and the detailed description is omitted.

System 1a in FIG. 3 includes information processor 10a, optical disk 20a, video device 30, recording medium 40a, mobile device 50a, and server 60a.

In the description of Example 1, as illustrated in FIG. 3, it is assumed that information processor 10a is the optical disk playback device such as a Blu-ray device, that optical disk 20a is the Blu-ray disk, and that video device 30 is the television set. In the description of Example 1, as illustrated in FIG. 3, it is assumed that recording medium 40a is the mobile media, that mobile device 50a is the mobile device, and that server 60a is the Blu-ray copy management server.

The system in FIG. 3 converts TS video content 200a in optical disk 20a into an MP4 video content and plays back the MP4 video content using mobile device 50a.

In Example 1, a large-capacity content of the MPEG2-TS scheme distributed by optical disk 20a such as a Blu-ray disk is used in mobile device 50a such as a smartphone and a tablet. Therefore, by permission of the copyright holder in some way, information processor 10a converts TS video content 200a in optical disk 20a such as a Blu-ray disk into MP4 video content 201a. Then, for example, information processor 10a transfers converted MP4 video content 201a to mobile device 50a. Therefore, mobile device 50a can use MP4 video content 201a of high-quality video.

More specifically, information processor 10a of an optical disk playback device converts the content multiplexed by the MPEG2-TS scheme of optical disk 20a into the content in the MP4 scheme after returning the content to the video stream, the audio stream, and the subtitle stream (plain text TS video content), thereby obtaining MP4 video content 201a.

A commercial video content (TS video content) stored in the optical disk such as the Blu-ray disk is usually encrypted by an encryption technology (medium band scheme) such as AACS, and a key (hereinafter, referred to as a disk key) necessary for the playback of the encrypted TS video content is recorded in the optical disk while encrypted.

Therefore, information processor 10a of the optical disk playback device decodes the encrypted disk key using a key (device key) possessed by itself (information processor 10a), and decodes the encrypted TS video content (encrypted TS video content 200a) using the obtained disk key, thereby obtaining a plain text TS video content (TS video content 200a). Information processor 10a plays back the plain text TS video content (TS video content 200a) obtained by the decoding using an AV decoder, and transmits the plain text TS video content to video device 30 such as a television set through a connection cable such as HDMI (registered trademark), thereby performing the playback of the video.

In the case that the optical disk playback device plays back the encrypted TS video content in the optical disk, decoding processing and a content handling rule are defined by copyright protection technology management association, such as AACS, which decides the copyright protection scheme of the optical disk.

In the case that the encrypted TS video content in the optical disk such as the Blu-ray disk is transferred to and played back by the mobile device, a file format of a transfer destination, a DRM technology, and a transfer permission rule are similarly defined by the copyright protection technology management association. At this point, the DRM technology includes a device bind scheme, a media bind scheme (such as CPRM, AACS, and NSM), and domain bind scheme (such as Fairplay, Playready, and Widevine). Accordingly, it is necessary for information processor 10a of the optical disk playback device to transfer MP4 video content 201a into which TS video content 200a in optical disk 20a such as the Blu-ray disk is converted, to the device and recording medium compatible with the copyright protection scheme certified as a certified DRM technology by the copyright protection technology management association such as AACS.

For example, information processor 10a re-encrypts converted MP4 video content 201a using the copyright protection scheme for the device bind scheme, and stores the re-encrypted content in storage capacitance unit 102 such as an HDD.

For example, information processor 10a re-encrypts converted MP4 video content 201a using the copyright protection scheme for the media bind scheme, and stores the re-encrypted content in recording medium 40a. In this case, information processor 10a checks the copy control condition of TS video content 200a in optical disk 20a by accessing server 60a that acts as the Blu-ray copy management server. When the copy is not permitted using the media bind scheme on the copy control condition, information processor 10a does not perform TS-MP4 conversion processing and the transfer processing. On the other hand, when the copy is permitted using the media bind scheme on the copy control condition, information processor 10a properly performs charge processing, and performs the TS-MP4 conversion processing and the transfer processing.

For example, in the case that converted MP4 video content 201a is recorded in mobile device 50a connected to information processor 10a using the domain bind scheme, information processor 10a stores converted MP4 video content 201a in mobile device 50a after re-encrypting converted MP4 video content 201a using the copyright protection scheme for the domain bind scheme. In this case, information processor 10a checks the copy control condition of TS video content 200a in optical disk 20a by accessing server 60a. When the domain bind scheme is not permitted on the copy control condition, information processor 10a does not perform the TS-MP4 conversion processing and the transfer processing. On the other hand, when the copy is permitted using the domain bind scheme on the copy control condition, information processor 10a properly performs the charge processing, and performs the TS-MP4 conversion processing and the transfer processing.

In one of the device bind scheme, the media bind scheme, and the domain bind scheme, when the permission is obtained, the MP4 video content is generated and stored in the device, whereby the playback can be performed by the device.

Thus, in Example 1, when the device and storage medium permitted on the copy control condition are connected to information processor 10a to perform the conversion processing of TS video content 200a in optical disk 20a, MP4 video content can be viewed by information processor 10a or mobile device 50a with no use of optical disk 20a. That is, MP4 video content can be viewed with no use of optical disk 20a when the conversion processing of TS video content 200a is performed, a user who uses system 1a in FIG. 3 can easily recognize whether MP4 video content 201a can be viewed with no use of optical disk 20a.

Example 2

Figure 4:
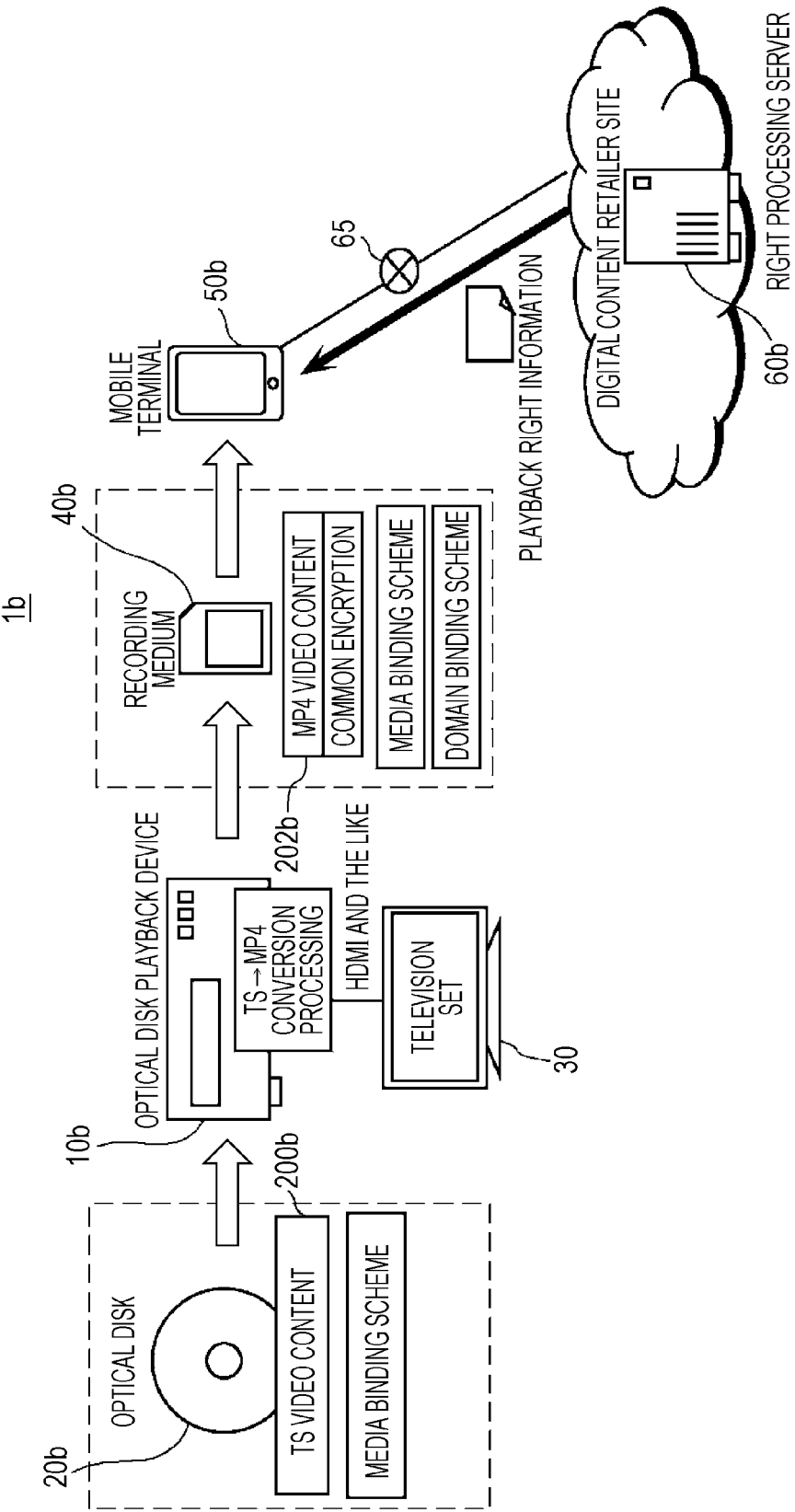
FIG. 4 is a view illustrating a system configuration example in Example 2 of the first exemplary embodiment.

FIG. 4 is a view illustrating a system configuration example in Example 2 of the first exemplary embodiment. The component similar to that in FIG. 1 is designated by the identical reference mark, and the detailed description is omitted.

System 1b in FIG. 4 includes information processor 10b, optical disk 20b, video device 30, recording medium 40b, mobile device 50b, and right processing server 60b.

In the description of Example 2, as illustrated FIG. 4, it is assumed that information processor 10b is the optical disk playback device such as a Blu-ray device, that optical disk 20b is a Blu-ray disk, and that the video device 30 is the television set. In the description of Example 2, as illustrated in FIG. 4, it is assumed that right processing server 60b is operated by a digital content retailer site and the like to issue playback right information.

FIG. 4 illustrates an example of system 1b that converts TS video content 200b in optical disk 20b into MP4 video content 202b and plays back MP4 video content 202b using mobile device 50b. FIG. 4 illustrates an example of the case that playback permission of MP4 video content 202b in mobile device 50b is dynamically performed by right processing server 60b in the digital content retailer site.

In Example 1 of FIG. 3, it is necessary to mount a processor that performs the complicated charge processing on the optical disk playback device and therefore the DRM technology of the conversion-destination mobile device is fixed. Additionally, Example 1 of FIG. 3 cannot flexibly meet with a business demand such as price revision of the copyright holder.

On the other hand, in system 1b of FIG. 4, a common encryption is introduced, and the acquisition of the playback right information for playing back the content is independent of the conversion processing into the MP4 file. A "late binding scheme" in which the charge processing is performed on the side of mobile device 50b that easily accesses the Internet is used in system 1b of FIG. 4.

Specifically, in the case that the encrypted TS video content (encrypted TS video content 200b) in optical disk 20b such as the Blu-ray disk is transferred to mobile device 50b, similar to Example 1, information processor 10b converts MP4 video content 202b using converter 101 after generating the plain text TS video content (TS video content 200b).

Then, information processor 10b re-encrypts MP4 video content 202b using the common encryption that is independent of the specific mobile device or playback software or the copyright protection technology, and stores MP4 video content 202b in storage capacitance unit 102, recording medium 40 such as an SD card, and the built-in memory in mobile device 50b. Information processor 10b generates the encrypted MP4 video content by encrypting converted MP4 video content 202b. However, in generating the encrypted MP4 video content, it is necessary to perform neither the access to the copy management server nor the charge processing of Example 1.

Then, mobile device 50b acquires the playback right information free or charge from right processing server 60b on the digital content retailer site designated by the copyright holder through network 65. Encrypted MP4 video content 202b transferred to the built-in memory of the mobile device 50b or recording medium 40b accessible by mobile device 50b cannot directly be played back.

More specifically, mobile device 50b acquires the playback right information indicating the playback permission of MP4 video content 202b, a key or the like being stored in the playback right information in order to decode the encryption. In acquiring the playback right information, mobile device 50b performs authentication and secret communication with right processing server 60b using an authentication protocol such as SSI. Therefore, right processing server 60b checks mobile device 50b, processes the playback right information by a method for writing an ID of the mobile device such that the playback can be performed only by mobile device 50b, and transmits the playback right information to the mobile device. In mobile device 50b, the processing scheme is fixed in the DRM including the media bind scheme and the domain bind scheme by acquiring the playback right information, and the playback can be performed.

Then, mobile device 50b plays back encrypted MP4 video content 202b using the acquired playback right information. As described above, the information on the key necessary for the playback of encrypted MP4 video content 202b and the usage rule are described in the playback right information.

In Example 2, the acquisition of the complicated playback right information and charge processing can be performed by not information processor 10b of the optical disk playback device, but mobile device 50b. It is only necessary for the copyright holder to ask the processing such as the price revision for the digital content retailer site that handles the own content. Accordingly, conveniently the digital content retailer site performs the processing in the same manner as own EST (Electronic Sell Through).

Problems existing in the scheme of Example 2 will be described below.

Figure 5:
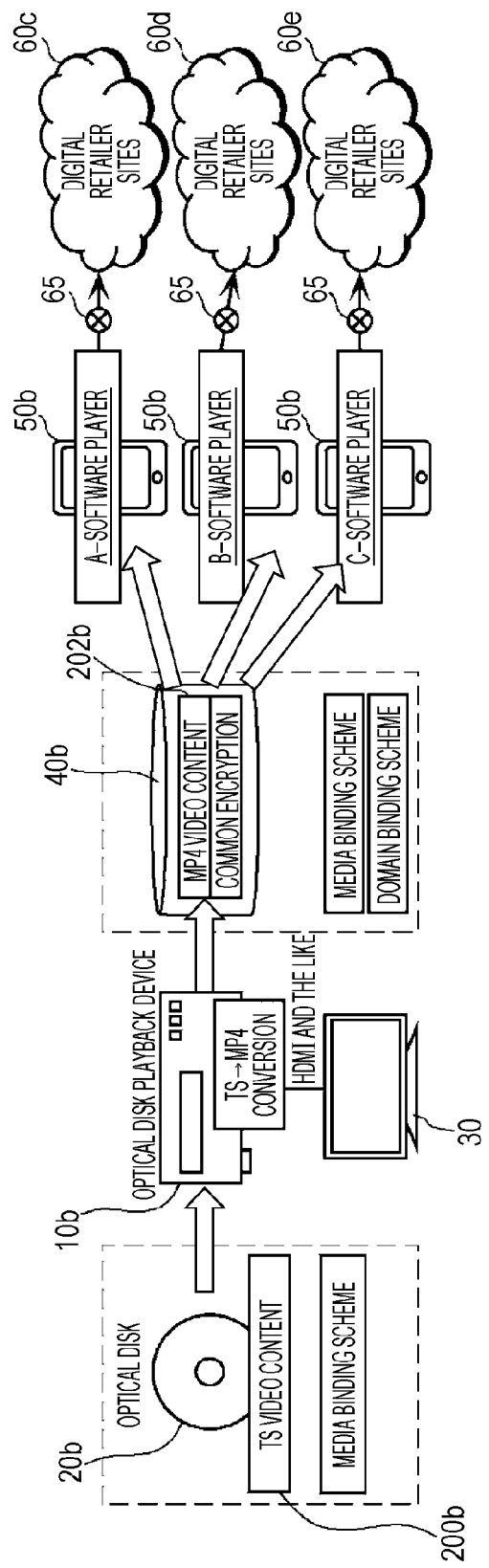
FIG. 5 is a view illustrating one of problems in Example 2 of the first exemplary embodiment.

FIG. 5 is a view illustrating one of problems in Example 2 of the first exemplary embodiment. The component similar to that in FIG. 4 is designated by the identical reference mark, and the detailed description is omitted.

The four problems will be described below.

1) In the case that information processor 10b of the optical disk playback device converts the file format to store the encrypted MP4 video content in storage capacitance unit 102 such as a built-in HDD and an external HDD, information processor 10b cannot play back the encrypted MP4 video content. Therefore, there is a problem in that the user cannot determine whether the conversion processing of the file format is successfully performed.

2) In the case that information processor 10b of the optical disk playback device plays back the encrypted MP4 video content stored in storage capacitance unit 102, it is necessary to access the digital content retailer site designated by the copyright holder to acquire the playback right information. Therefore, sometimes it is necessary to mount the processor that performs the complicated charge processing on the information processor 10b.

3) The user of information processor 10b cannot recognize which mobile device or which DRM technology is used in the playback. Sometimes a user's manual enclosed in optical disk 20a indicates information that the user can access the digital content retailer or which mobile device is supported. However, it is considered that the user does not understand the information in operating information processor 10b.

4) It is also considered that a plurality of digital content retailer sites exist as illustrated in FIG. 5. It is considered that the copyright holder can arbitrarily decide which digital content retailer site is used. Depending on intention of the copyright holder, sometimes all the plurality of digital content retailer sites can be used, and sometimes only one digital content retailer site can be used; therefore, the user is confused. Additionally, the copyright holder can freely set the digital content retailer site in each content. A certain content is available only on digital content retailer site 60c, and another content is available on not only digital content retailer site 60c but also digital content retailer sites 60d and 60e. Therefore, it is difficult for the user to understand the digital content retailer site.

Second Exemplary Embodiment

A hybrid system according to a second exemplary embodiment, in which the user's understandability that is of a merit of system 1a in Example 1 of the first exemplary embodiment and the easiness of feasibility that is of a merit of system 1b in Example 2 are combined, will be described below.

(Entire Configuration of System)

Figure 6:
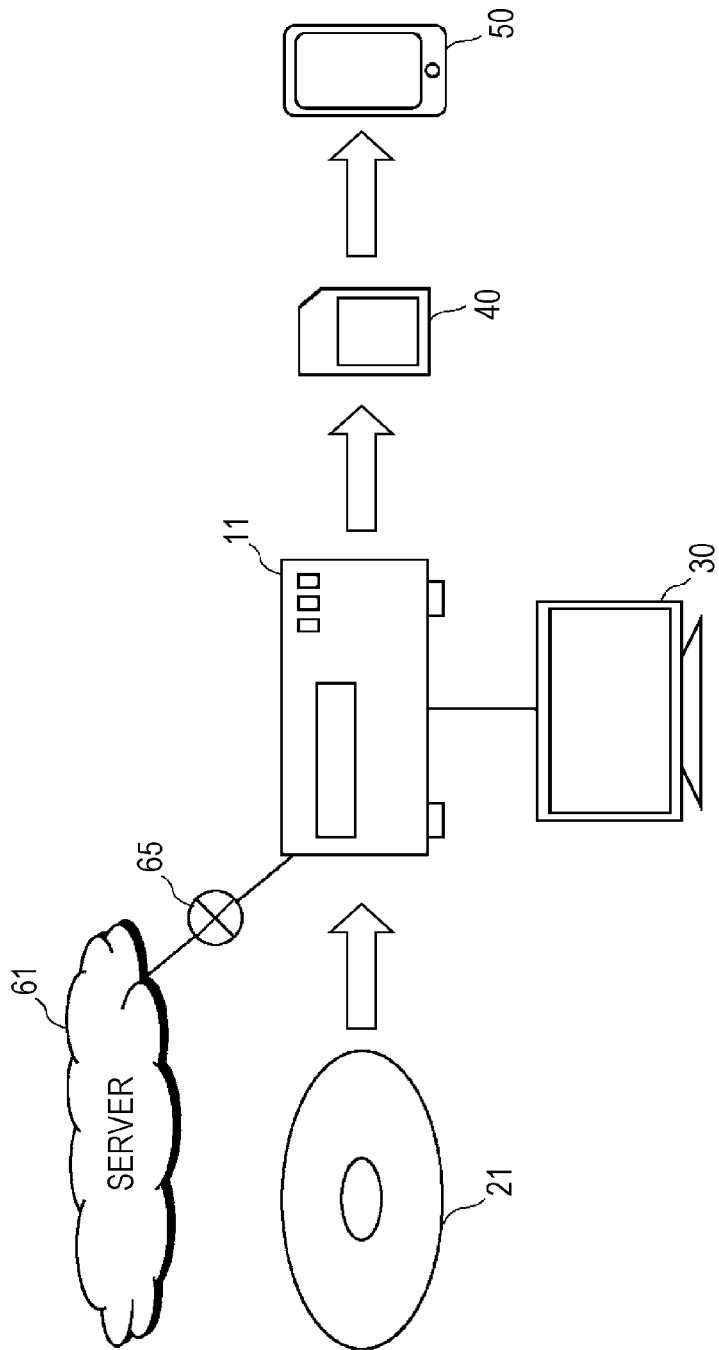
FIG. 6 is a view illustrating an entire image of a system according to a second exemplary embodiment.

FIG. 6 is a view illustrating an entire image of a system according to a second exemplary embodiment. The component similar to that in FIG. 1 is designated by the identical reference mark, and the detailed description is omitted.

System 2 in FIG. 6 includes information processor 11, optical disk 21, video device 30, recording medium 40, mobile device 50, server 61, and network 65.

In the same manner as system 1 of the first exemplary embodiment, system 2 is a digital bridge system in which, by the permission of the copyright holder, the content in optical disk 21 is copied to information processor 11, recording medium 40, and mobile device 50 and enabled to be viewed by information processor 11 and mobile device 50 with no use of optical disk 21. Additionally, in system 2, the conversion control information in optical disk 21 or the conversion control information on server 61 is checked in converting the file format. Therefore, the user can be caused to check whether the file format is correctly converted or whether the file format is performed according to the intention of the copyright holder.

In the same manner as information processor 10 of the first exemplary embodiment, information processor 11 exports the encrypted content recorded in optical disk 21. Information processor 11 converts the encrypted content recorded in optical disk 21 into that in the export format (file format), and exports the converted content to recording medium 40 and mobile device 50. Details are described later.

Optical disk 21 is a recording medium such as a Blu-ray disk and a DVD disk. For example, the encrypted content is recorded in optical disk 21, and the conversion control information indicating the usage rule of the encrypted content is stored in optical disk 21. In the second exemplary embodiment, the conversion control information includes the first flag indicating whether information processor 11 can play back the export content. At this point, the first flag is expressed by 1 bit, and defined by the data name of Export_Playable.

The conversion control information may also include the second flag indicating whether server 61 checks the value of the first flag. For example, the second flag is expressed by 1 bit, and defined by a data name of a check SFF permission server.

Sometimes the additional data (data for export) that can be used in the export content is stored in optical disk 21.

Server 61 is a management server that performs the DRM (Digital Rights Management). For example, server 61 manages the playback right information on the usage rule of the content of optical disk 21. In the second exemplary embodiment, server 61 is connected to information processor 11 through network 65. Server 61 also manages the conversion control information indicating the usage rule of the encrypted content including the first flag indicating whether information processor 11 can play back the export content. In the case that the conversion control information managed by server 61 differs from the conversion control information stored in optical disk 21, information processor 11 preferentially uses the conversion control information managed by server 61. In the case that the second flag is further included in the conversion control information in optical disk 21, information processor 11 may use the conversion control information managed by server 61.

(Information Processor)

Figure 7:
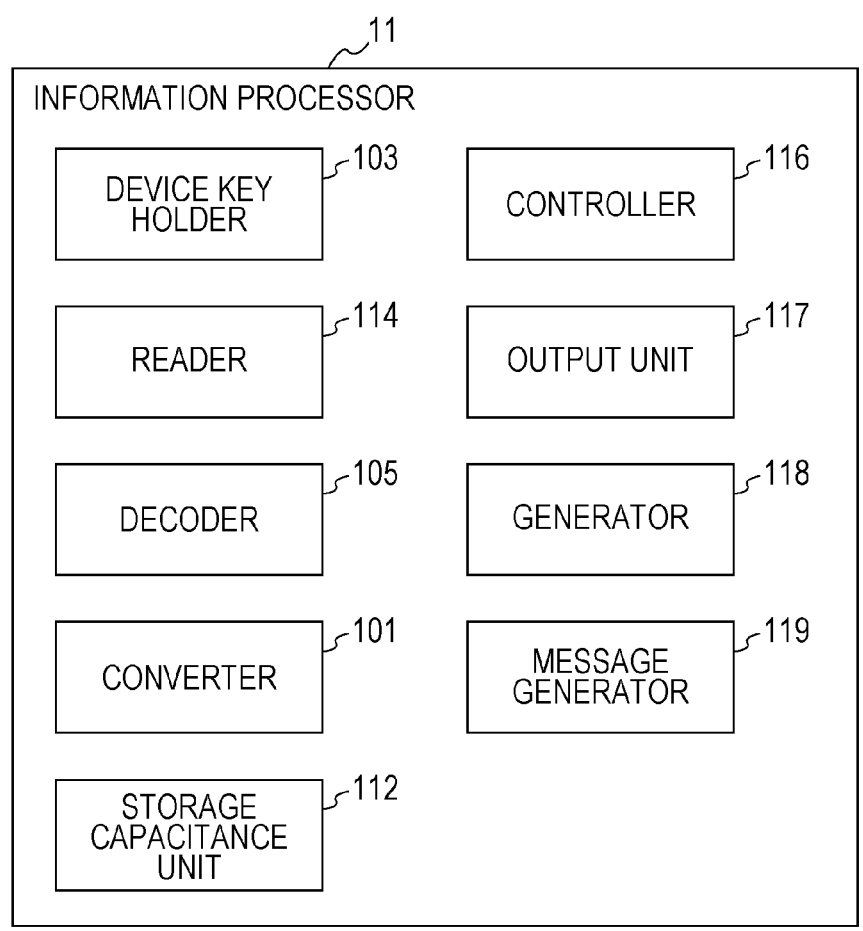
FIG. 7 is a view illustrating an example of a detailed configuration of an information processor in the second exemplary embodiment.

FIG. 7 is a view illustrating an example of a detailed configuration of the information processing device in the second exemplary embodiment. The component similar to that in FIG. 2 is designated by the identical reference mark, and the detailed description is omitted.

Information processor 11 in FIG. 7 includes converter 101, device key holder 103, reader 104, decoder 105, storage capacitance unit 112, controller 116, output unit 117, generator 118, and message generator 119. Information processor 11 does not necessarily include output unit 117, generator 118, and message generator 119, but information processor 11 may include one or two of output unit 117, generator 118, and message generator 119.

Storage capacitance unit 112 is a detachable, portable storage device, such as the built-in HDD (Hard Disk Drive) and the external HDD, which is provided in information processor 10.

Device key holder 103 holds the device key provided to information processor 11.

Reader 114 reads the encrypted content and conversion control information from optical disk 21.

Using a device key held by device key holder 103, decoder 105 decodes the encrypted content read by reader 104.

Converter 101 obtains an export content by converting the content decoded by decoder 105 into that in an export format. In the description of the second exemplary embodiment, it is assumed that the encrypted content is stored in the MPEG2-TS format in optical disk 20, and that converter 101 converts the MPEG2-TS format content into that in the MP4 format as the export format.

Controller 116 controls whether the playback right information is generated according to a first flag. For example, when the first flag indicates 0 (zero), controller 116 performs the control such that generator 118 does not generate the playback right information. On the other hand, when the first flag indicates 1, controller 116 performs the control such that generator 118 generates the playback right information.

In the case that the second flag is included in conversion control information of optical disk 21, controller 116 may be operated as follows. In the case that the second flag indicates that server 61 checks the value of the first flag, controller 116 may perform server 61 so as to check the value of the first flag held by server 61. In the case that the checked value of the first flag held by server 61 differs from the value of the first flag included in the conversion control information read by reader 114, controller 116 may change the value of the first flag included in the conversion control information read by reader 114 to the value of the first flag held by server 61.

The navigation information included in the MPEG2-TS scheme file is deleted when converted into that in the MP4 format. Although described in detail later, converter 101 converts the information on the export content into the manifest file using not the navigation information included in the MPEG2-TS scheme file but the additional data (data for export).

Generator 118 generates the playback right information indicating that information processor 11 can play back the export content converted by converter 101 according to the conversion control information read by reader 114. In the second exemplary embodiment, in the case that controller 116 performs the control such that the playback right information cannot be generated, generator 118 does not generate the playback right information. On the other hand, in the case that controller 116 performs the control such that the playback right information can be generated, generator 118 generates the playback right information.

Message generator 119 generates a message. For example, in the case that the first flag indicates 0 (zero), message generator 119 generates a message indicating that information processor 11 cannot play back the export content.

Output unit 117 exports the export content converted by converter 101. In the second exemplary embodiment, output unit 117 exports the export content converted by converter 101 and the playback right information generated by generator 118 to mobile device 50 or portable recording medium 40. In the case that message generator 119 generates the message, output unit 117 directly outputs the message to video device 30.

(Operation of Information Processor)

The operation of information processor 11 having the above configuration will be described below.

Figure 8:
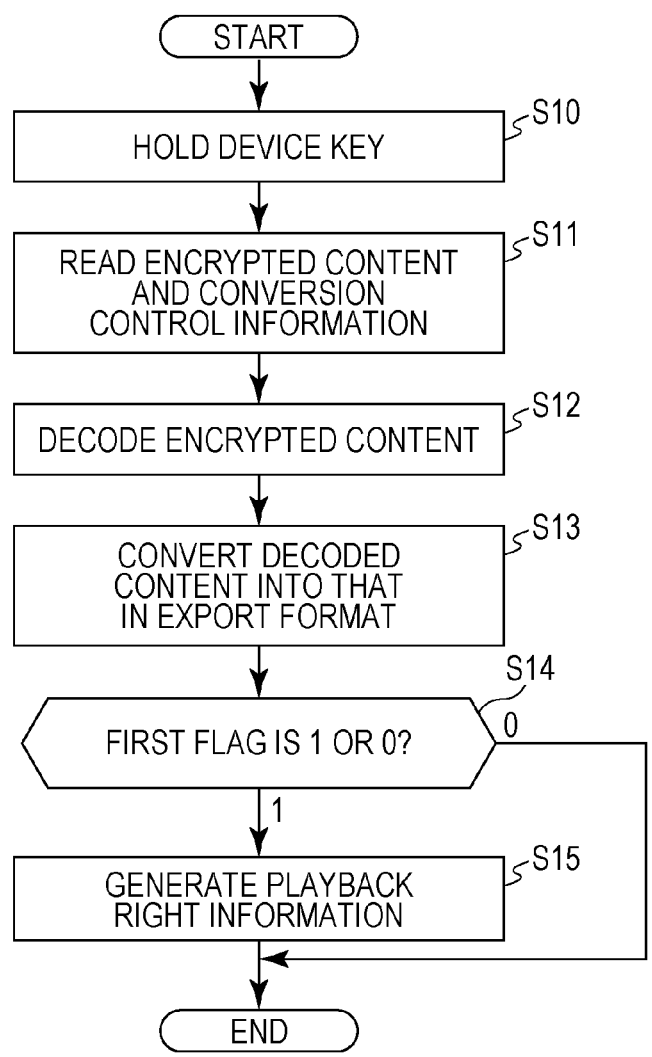
FIG. 8 is a flowchart illustrating an example of operation of an information processor in the second exemplary embodiment.

FIG. 8 is a flowchart illustrating an example of the operation of the information processor in the second exemplary embodiment.

Information processor 11 holds the device key provided to itself (information processor 11) (S10).

Information processor 11 reads the encrypted content and the conversion control information from optical disk 21 (S11).

Information processor 11 decodes the encrypted content read in S11 using the device key held in S10 (S12). The method for decoding the encrypted content using the device key is described in detail later.

Information processor 11 converts the content decoded in S12 into that in the export format (S13), thereby obtaining the export content. In the second exemplary embodiment, the encrypted content is stored in the MPEG2-TS format in optical disk 20, and converter 101 converts the MPEG2-TS format content into that in the MP4 format as the export format.

Information processor 11 checks the value of the first flag (S14). When the value of the first flag indicates 1, information processor 11 generates the playback right information indicating that information processor 11 can play back the export content converted in S13 according to the conversion control information read in S11 (S15). Information processor 11 ends the processing when the value of the first flag indicates 0.

When the value of the first flag indicates 0 in S14, the message indicating that information processor 11 cannot play back the export content may be generated and transmitted to video device 30 that is viewed by the user.

The processing in S14 may be performed in advance of the processing in S12. In this case, when the value of the first flag indicates 1, the processing may go to S12, and perform the pieces of processing to S15. On the other hand, when the value of the first flag indicates 0, the processing is ended without performing the processing in S12, and the message indicating that information processor 11 cannot play back the export content may be generated and transmitted. When the value of the first flag indicates 0, the message indicating whether the processing in S12 is performed may be generated and transmitted to the user.

In the case that the conversion control information in optical disk 21 read in S11 includes the second flag indicating that server 61 checks the value of the first flag, information processor 11 may check the value of the first flag held by server 61. In the case that the checked value of the first flag held by server 61 differs from the value of the first flag included in the conversion control information read in S11, information processor 11 may change the value of the first flag included in the conversion control information read in S11 to the value of the first flag held by server 61, and perform the pieces of processing from S12.

A specific example of system 2 having the above configuration will be described as Example 1.

Example 1

Figure 9:
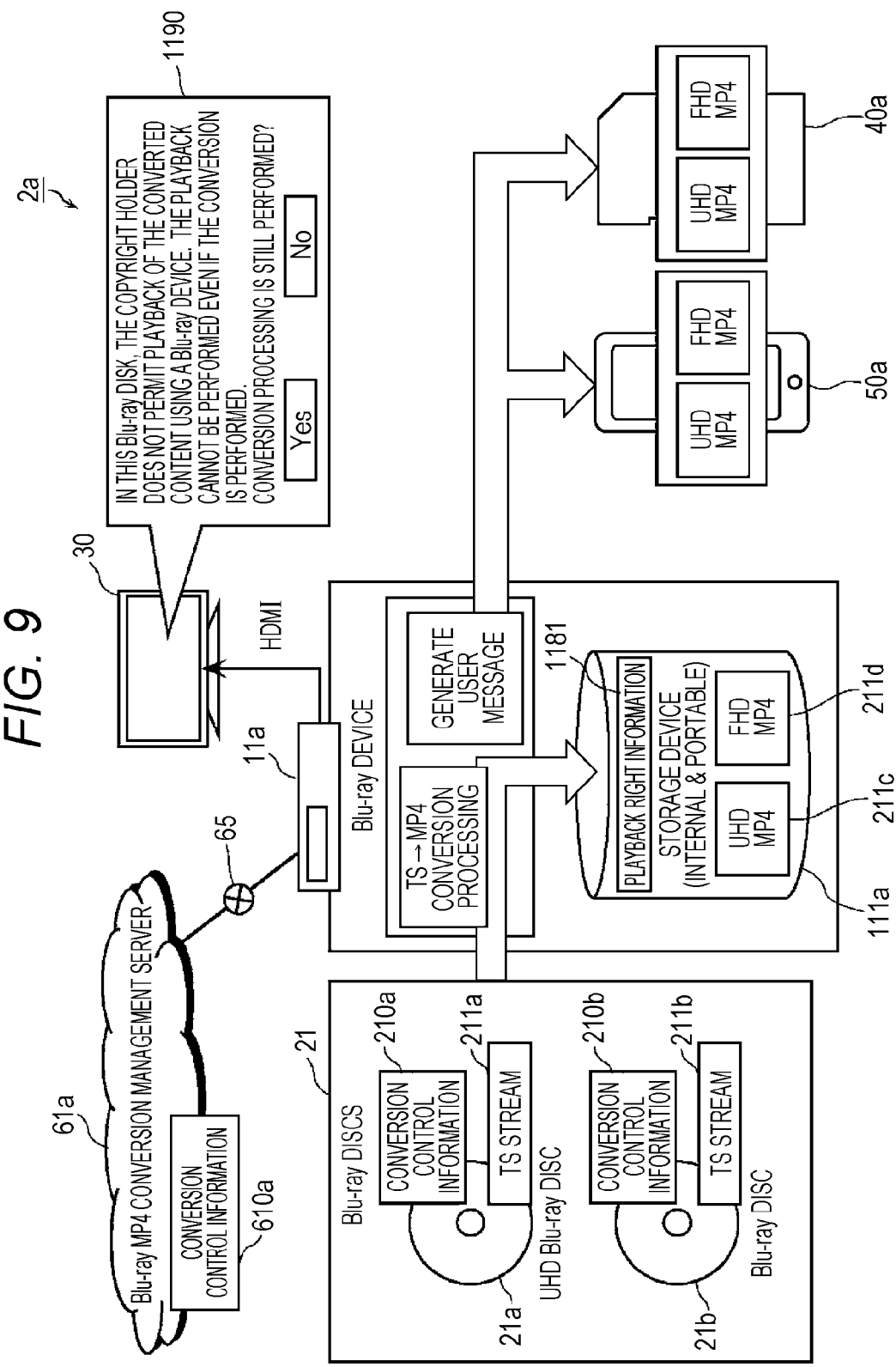
FIG. 9 is a view illustrating a system configuration example in Example 1 of the second exemplary embodiment.

FIG. 9 is a view illustrating a system configuration example in Example 1 of the second exemplary embodiment. The component similar to that in FIGS. 1 and 6 is designated by the identical reference mark, and the detailed description is omitted.

System 2a in FIG. 9 includes information processor 11a, optical disk 21, video device 30, recording medium 40a, and mobile device 50a.

In the description of Example 1, as illustrated in FIG. 9, it is assumed that information processor 11a is the optical disk playback device such as the Blu-ray device, that optical disk 21 is optical disk 21a of a UHD Blu-ray disk or optical disk 21b of the Blu-ray disk, and that video device 30 is the television set. In the description of Example 1, as illustrated in FIG. 9, it is assumed that server 61a is a Blu-ray MP4 conversion management server. In the description of Example 2, UHD (Ultra High Definition) and 4K (4K resolution or 4K2K) have the identical meaning from the viewpoint of high-resolution video, and are expressed as UHD. Similarly, FHD (Full High Definition) in FIG. 9 has the meaning of the high-resolution video similar to 2K (2K resolution or 1080), and is expressed as FHD.

FIG. 9 illustrates a system that converts TS stream 211a of the video content in optical disk 21a or TS stream 211b of the video content in optical disk 21b into UHD MP4 video content 211c or FHD MP4 video content 211d of the MP4 video content, and plays back UHD MP4 video content 211c or FHD MP4 video content 211d using mobile device 50a. As illustrated in FIG. 9, conversion control information 210a is stored in optical disk 21a, and conversion control information 210b is stored in optical disk 21b.

In Example 1, according to the intention of the copyright holder, the processing converting the TS stream into the MP4 video content is changed by checking the conversion control information stored in optical disk 21 and the conversion control information on the content stored in server 61 on network 65.

Specifically, playback right information 1181 indicating that information processor 11a can play back the MP4 video content subjected to the conversion processing is generated in the case that the first flag included in the conversion control information permits information processor 11a of the optical disk playback device to perform the playback. Therefore, information processor 11a can play back the converted MP4 video content. Accordingly, even if the user does not have mobile device 50a such as the device compatible with the DRM technology permitted by the copyright holder, the user can check whether the conversion processing is correctly performed by playing back the MP4 video content subjected to the conversion processing using information processor 11a.

In the case that the first flag included in the conversion control information indicates prohibition on the playback, for example, information processor 11a may produce the message indicating that the MP4 video content (export content) subjected to the conversion processing cannot be played back and checking whether the conversion processing is performed as indicated by message 1190. Thus, a proper user guidance message can be displayed even if the first flag included in the conversion control information indicates the prohibition on the playback. Even if the content of the optical disk is converted into the export format (MP4 scheme), that the information processor 11a can be neither played back nor checked can clearly be expressed to the user. Therefore, in the case that information processor 11a cannot play back the MP4 video content subjected to the conversion processing by information processor 11a, the user is encouraged not to select the performance of the conversion processing, or the user selects the performance of the conversion processing by user's consent to the fact that information processor 11 cannot check the conversion processing, so that the user can be prevented from being confused.

A data structure of the MP4 video content generated through the conversion processing will be described below with optical disk 21b of the Blu-ray disk as an example.

Figure 10:
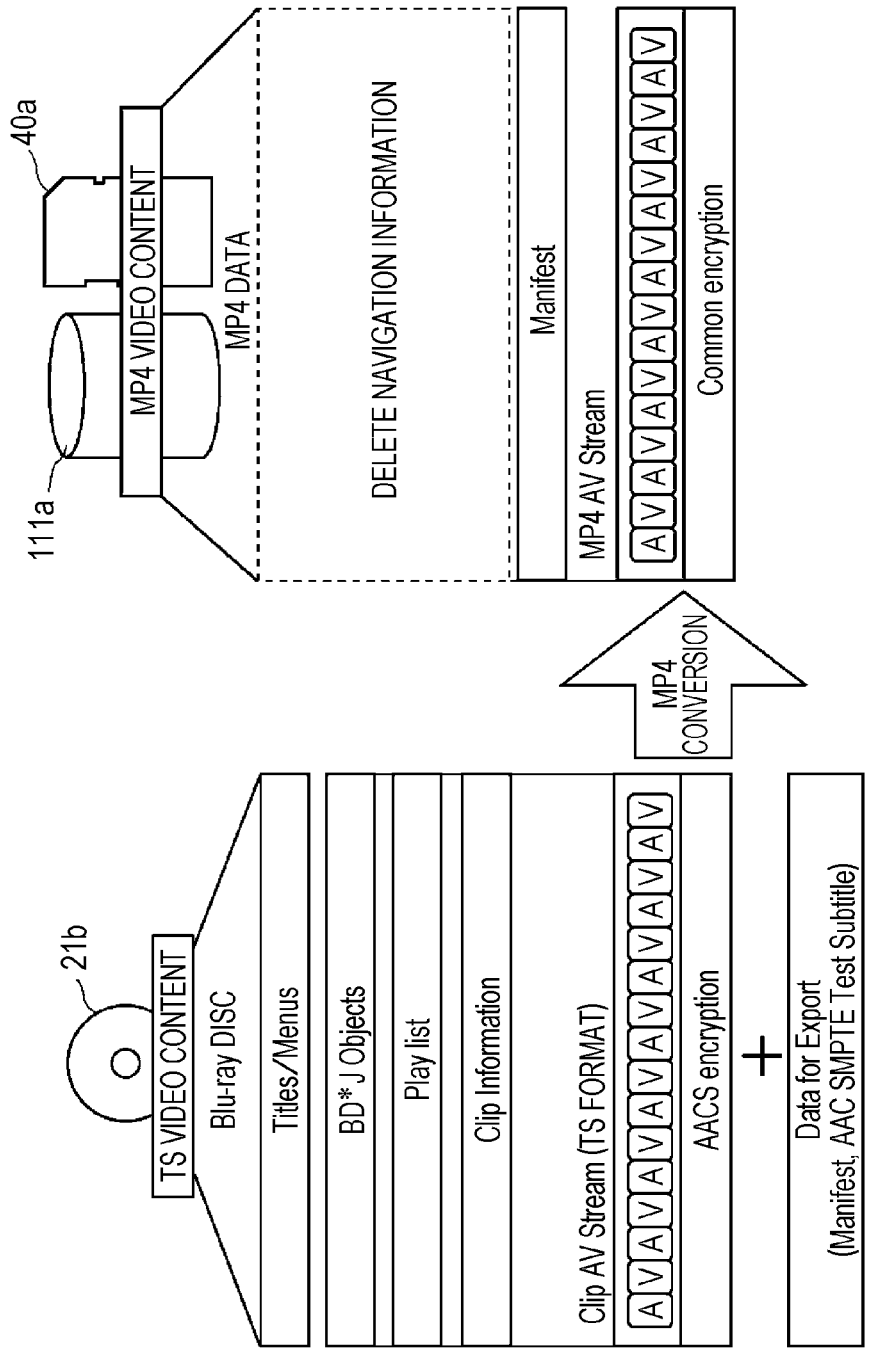
FIG. 10 is a view illustrating outlines of a data structure of a TS video content recorded in an optical disk and a data structure of a converted MP4 video content.

FIG. 10 is a view illustrating outlines of the data structure of the TS video content recorded in the optical disk and the data structure of the converted MP4 video content.

As illustrated in FIG. 10, the TS video content is recorded in optical disk 21b of the Blu-ray disk, and the TS video content includes the navigation information on a menu and the like (such as titles/menus, BD-J Objects, play list, and clip information) in addition to TS stream 211a indicated by the clip AV Stream (TS format). The clip AV Stream (TS format) is encrypted by an encryption technology such as AACS. Optical disk 21b includes the additional data (data-for-export file) that can be used in the export content. Sometimes the data-for-export file is stored in server 61 that can be connected through network 65. Although described in detail later, information processor 11a may acquire the data-for-export file from server 61 in the case that the data-for-export file does not exist in optical disk 21b.

On the other hand, the MP4 video content into which the TS video content is converted includes the manifest file generated from the data-for-export file as the minimum navigation information and the MP4 AV stream. The MP4 AV Stream is encrypted by the common encryption.

The processing of generating the manifest file from the data-for-export file will be described below.

Figure 11:
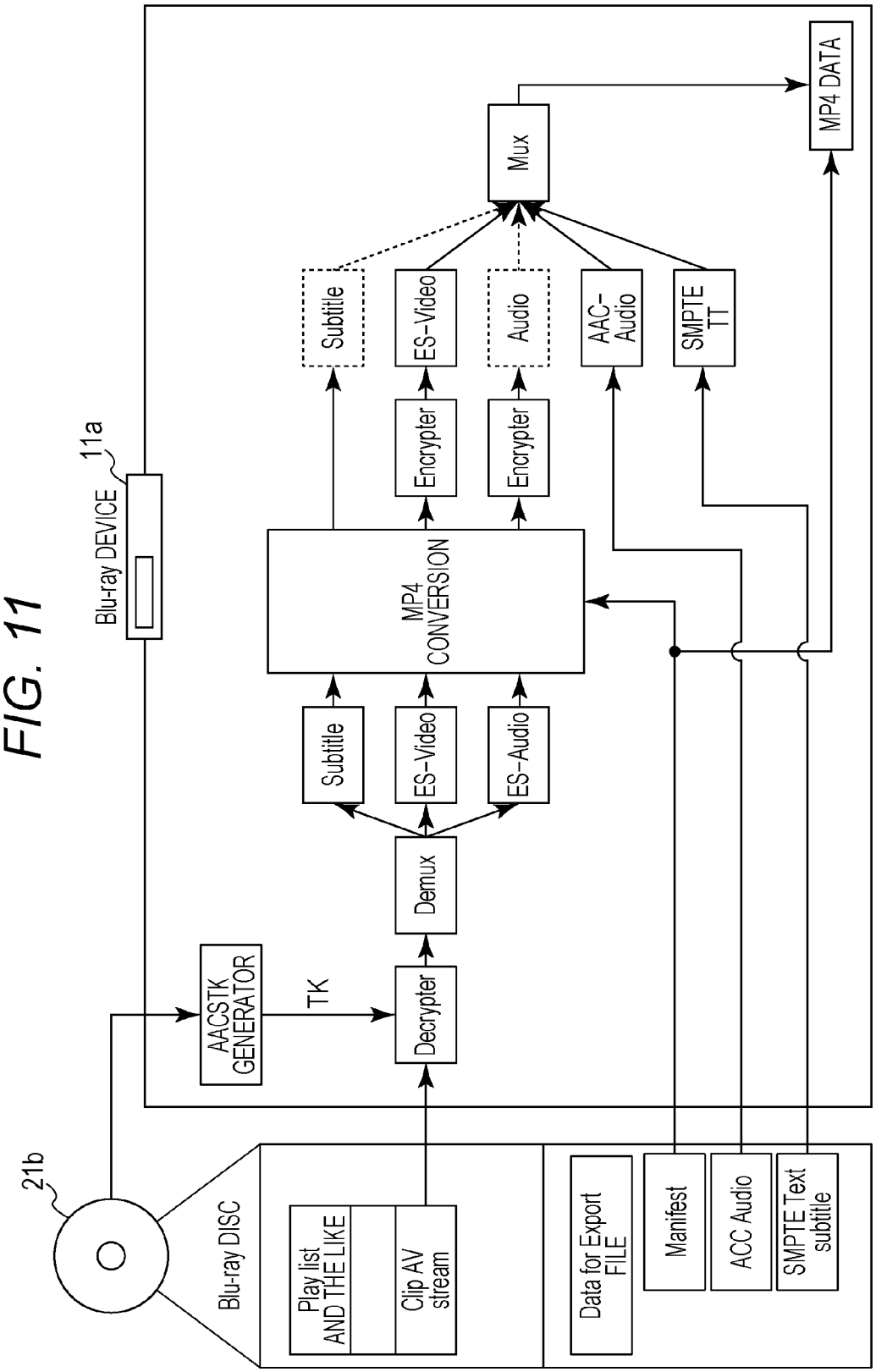
FIG. 11 is a view illustrating an example of processing of generating a manifest file from a data-for-export file.

FIG. 11 is a view illustrating an example of the processing of generating the manifest file from the data-for-export file. FIG. 11 illustrates an example of the case that processing (SFF export processing) is performed in a Standard File Format (SFF) compatible with a Common File Format. The SFF is one of MP4 format schemes. In other words, examples of the MP4 format formats include W3C, 3GAP, DLE, and SFF.

As can be seen from FIG. 11, the MP4 video content (MP4 data) is generated with respect to the audio or subtitle using AAC audio or SMPTE text subtitle included in the data-for-export file.

As described above, information processor 11a may acquire the data-for-export file from server 61 and perform the above processing in the case that the data-for-export file does not exist in optical disk 21b.

(Detailed Optical Disk)

The detailed optical disk such as the Blu-ray disk will be described below.

The data structure of the TS stream (MPEG2-TS scheme content) indicated by the clip AV stream (TS format) stored in optical disk 21b such as the Blu-ray disk will be described with reference to FIG. 12.

Figure 12:
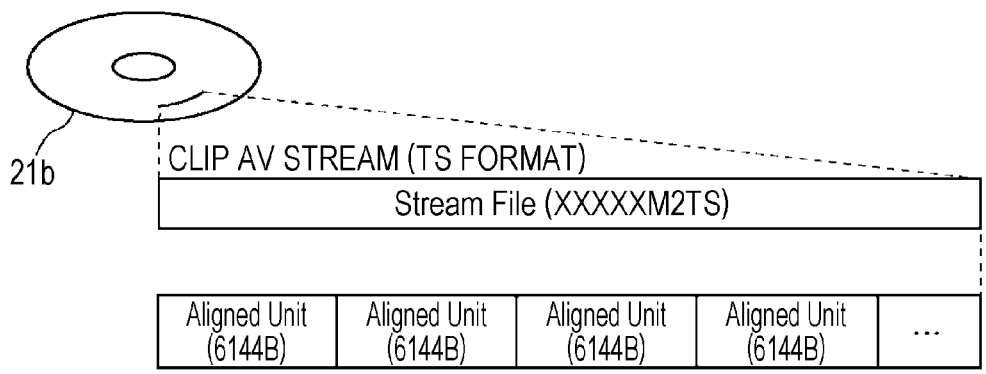
FIG. 12 is a view schematically illustrating an example of a content structure of an MPEG2-TS scheme stored in the optical disk.

FIG. 12 is a view schematically illustrating an example of the content structure of the MPEG2-TS scheme stored in the optical disk. The stream file of the content is stored in the optical disk. In the example of FIG. 9, only one stream file is stored in the optical disk. Alternatively a plurality of stream files may be stored in the optical disk. The stream file is recorded with a file name of XXXXX.M2TS. A number is described in) XXXXX. In the case that the plurality of contents are stored, the contents can individually be managed by the numbers.

The stream file is divided into a plurality of units called aligned units each of which has 6144 bytes. The aligned unit is a unit of the encryption. A data amount of the stream file does not necessarily become a multiple of 6144 bytes. In the case that the data amount of the stream file does not become the multiple of 6144 bytes, desirably the data amount becomes the multiple of 6144 bytes by a method for storing NULL data in an end of the content.

A method for decoding each aligned unit will be described with reference to FIG. 13.

Figure 13:
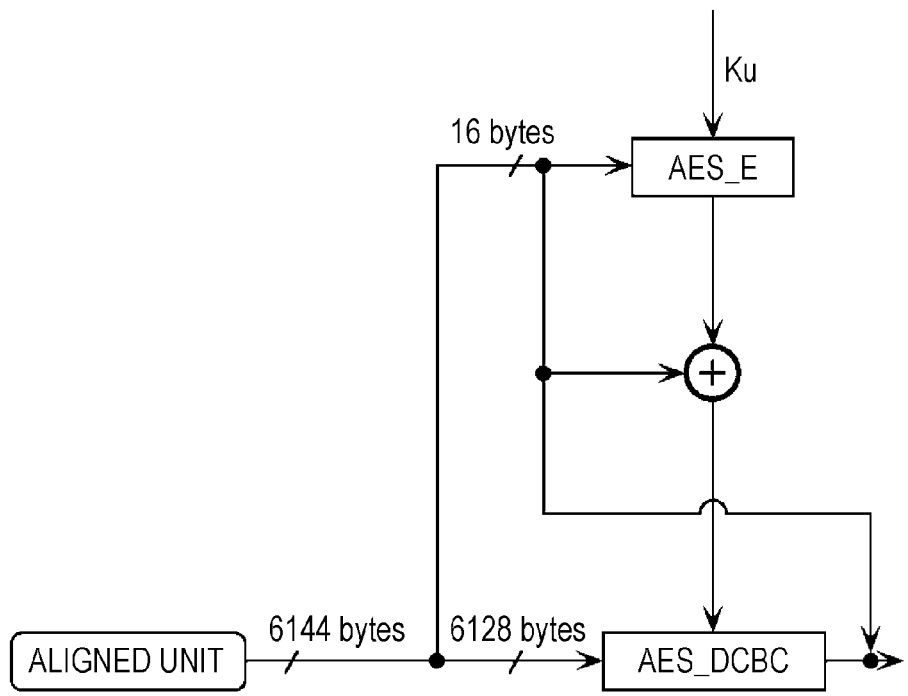
FIG. 13 is a view illustrating a method for decoding each aligned unit.

FIG. 13 is a view illustrating the method for decoding each aligned unit. The content on the optical disk is encrypted using data called unit key Ku. The 6144-byte data of each aligned unit is separated into leading 16 bytes and remaining 6128 bytes. AES_E that is of the decoding processing of the AES encryption scheme is performed on the leading 16 bytes using unit key Ku. An exclusive OR (XOR) of the obtained data and the leading 16 bytes is calculated. The remaining 6128-byte data is decoded in an AES-DCBC mode using the data obtained by the XOR as the key. A 6144-byte plain text is obtained by adding the obtained plain text data to the leading 16-byte data.

The processing in acquiring the unit key used to decode the aligned unit will be described with reference to FIG. 14.

Figure 14:
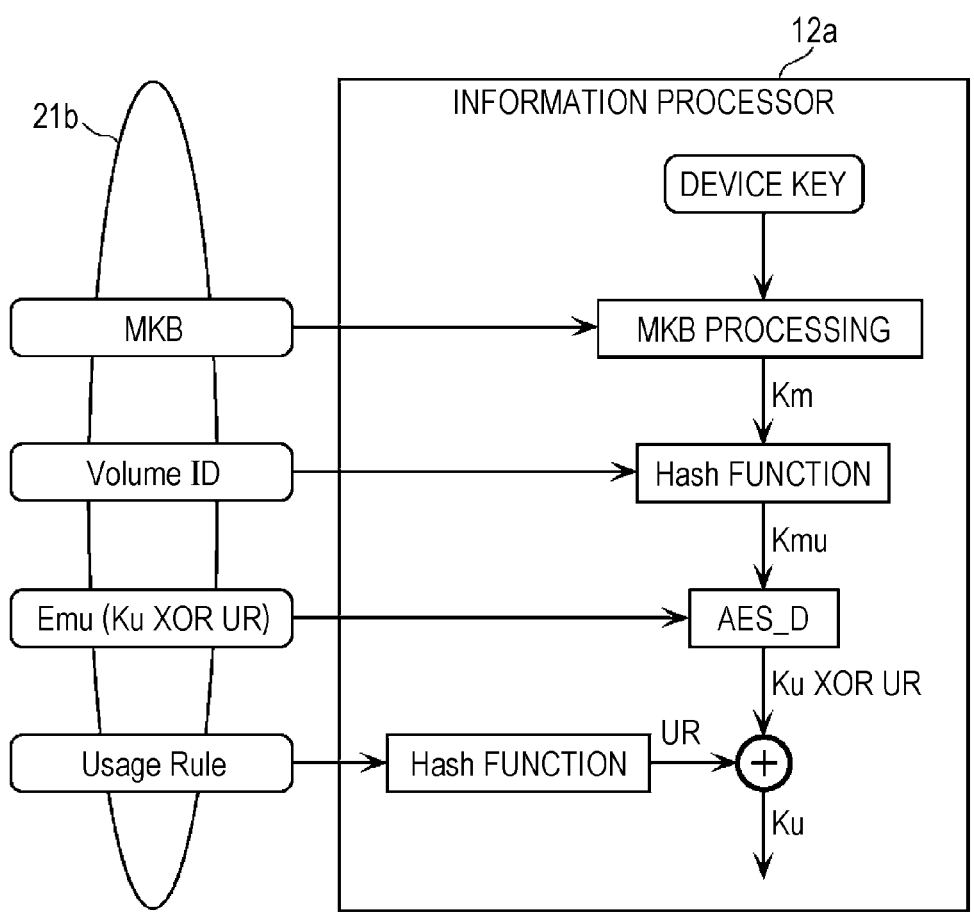
FIG. 14 is a view illustrating processing of acquiring unit key Ku.

FIG. 14 is a view illustrating the processing of acquiring unit key Ku. At this point, unit key Ku is stored in the optical disk while encrypted.

The data called a Media Key Block (MKB in FIG. 14) is stored in the optical disk. The stored MKB is read and processed using the device key held by information processor 11a of the playback player, thereby generating medium key Km. At this point, the MKB is previously generated such that the correct medium key cannot be acquired by a device key possessed by an unauthorized playback player.

A volume ID is stored in a special area on the optical disk. Information processor 11a of the playback player reads the volume ID, and performs processing on the read volume ID using medium key Km and hash function, thereby acquiring medium unique key Kmu. It is necessary to acquire the volume ID in order to acquire medium unique key Kmu. This is because the simple bit-by-bit copy of the optical disk is prevented by the volume ID that it is extremely difficult for a usual method to copy.

Then, information processor 11a reads encrypted title key Emu (Ku XOR UR). Information processor 11a acquires a deformed unit key (Ku XOR UR) by decoding read encrypted title key Emu (Ku XOR UR) using medium unique key Kmu.

Information processor 11a reads the usage rule from the optical disk. Information processor 11a acquires unit key Ku by calculating the exclusive OR (XOR) of value UR, which is obtained by subjecting the usage rule to the hash function, and the deformed unit key (Ku XOR UR). It is necessary to acquire the usage rule in order to acquire unit key Ku. This is because falsification of the usage rule is prevented on the optical disk.

The data structure of the MP4 format content (MP4 video content) such as the MP4 AV stream will be described below with reference to FIG. 15.

Figure 15:
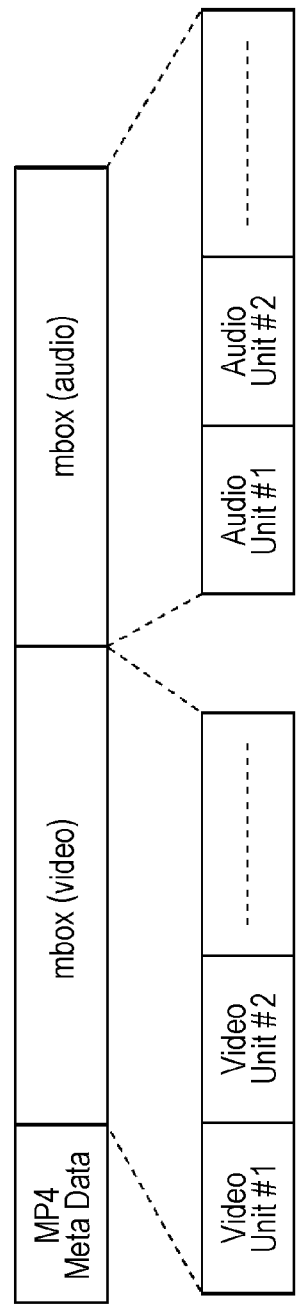
FIG. 15 is a view schematically illustrating an example of an MP4 format content structure.

FIG. 15 is a view schematically illustrating an example of the MP4 format content structure.

As illustrated in FIG. 15, MP4 meta-data in which various pieces of control information necessary for the playback are stored is disposed in a leading portion of the MP4 format content. Information on a recording position and size of each mbox is stored in the MP4 meta-data.

The mbox includes a video mbox that is expressed by mbox (video) in FIG. 15, the video data being stored in the video mbox, and an audio mbox that is expressed by mbox (audio) in FIG. 15, the audio data being stored in the audio mbox. In the data structure of FIG. 15, one audio mbox is disposed and one audio mbox is disposed by way of example. Alternatively, a plurality of mboxes (audio) may be disposed with respect to one mbox (video) such that the plurality of pieces of audio data such as English data and Japanese data are recorded. Not only the video data and the audio data may collectively be disposed by one mbox (video) and one mbox (audio), but also each of the video data and the audio data may be fragmented such that mbox (video) #1, mbox (audio) #1, mbox (video) #2, and mbox (audio) #2 are disposed while mixed.

The video data and the audio data are recorded in the mbox of FIG. 15 in units of video and audio. Each of the units of video and audio is usually configured by the video data or the audio data having a playback time of several seconds.

The MP4 format content (MP4 video content) is encrypted in units of video and audio. More specifically, in the case that the MP4 format content (MP4 video content) is encrypted, one key is provided to each of the video mbox and the audio mbox, and the encryption is performed in the AES-CTR mode in units of video and audio using the provided key. On the other hand, the MP4 format content (MP4 video content) is decoded using different Initial Vectors (IVs) allocated to units and the key. The Initial Vector IV allocated to each unit is included in the MP4 format content (MP4 video content). For example, the Initial Vector IV is stored in the MP4 meta-data of FIG. 11.

(Conversion Control Information)

The detailed conversion control information of the second exemplary embodiment will be described with reference to FIGS. 16 and 17.

FIG. 16 is a view illustrating an example of a detailed configuration of the conversion control information in the second exemplary embodiment.

As described above, the conversion control information indicates the usage rule of the encrypted content. FIG. 16 illustrates the data structure of the usage rule indicated by the conversion control information stored in optical disk 21.

A flag defined by data names of Encryption Plus Non-assert (EPN) and Copy Control Information (CCI) indicates whether the encrypted content recorded in optical disk 21 can be copied. For example, in optical disk 21 used to distribute a movie content, copy never is designated as the CCI, but the copy cannot be performed.

A flag defined by a data name of Image_Constraint_Token designates which the output of HD image quality or only SD image quality is authorized during the analog output.

A flag defined by a data name of Digital_Only_Token designates whether the analog output is authorized.

A flag defined by a data name of Analog Protection System Trigger Bits (APSTB) designates whether an analog copy control signal is multiplexed during the analog output.

A flag defined by a data name of Export_Playable is a data item that is newly added in the second exemplary embodiment, and is the first flag indicating whether information processor 11 can play back the export content. The flag (first flag) is expressed by 1-bit data. In the case that the flag (first flag) defined by the data name of Export_Playable indicates 0 (zero), the playback player converted into the MP4 format cannot play back the content converted into the MP4 format. On the other hand, in the case that the flag (first flag) defined by the data name of Export_Playable indicates 1, the playback player converted into the MP4 format can play back the content converted into the MP4 format.

The operation of the playback player in the case that the flag (first flag) defined by the data name of Export_Playable indicates 0 (zero) will be described with information processor 11a in FIG. 9, which is an example of the playback player, as an example.

Information processor 11a converts the encrypted MPEG2-TS format data of the TS video content in the optical disk 21 into the plain text, and releases the multiplexing to obtain video and audio elementary streams. Information processor 11a converts the file format of the video and audio elementary streams, and obtains the plain text content (MP4 video content) in the MP4 format by storing the converted file format in the mbox of the MP4 format data.

In performing the conversion processing into the MP4 format, information processor 11a conducts communication with server 61a acting as the export authentication server using the authentication protocol, and checks whether the TS video content in optical disk 21 can be exported. When conducting communication with server 61a, information processor 11a not only simply checks whether server 61a performs the export processing, but also may acquire video and audio encryption keys used to perform the conversion processing into the MP4 format. In the example of FIG. 9, the video content recorded in optical disk 21 is converted (re-encrypted) into the export format. Alternatively, the conversion processing (re-encryption processing) needs not to be performed when a special data structure in which the necessity of the re-encryption of the conversion of the MPEG2-TS format into the MP4 format is eliminated is used in the video content recorded in optical disk 21.

In the case that information processor 11a conducts communication with server 61a to check that the export can be performed, information processor 11a re-encrypts the plain text content (MP4 video content) in the MP4 format, and exports the MP4 video content to recording medium 40a or the built-in memory of mobile device 50a. That is, because Export_Playable indicates 0 (zero), information processor 11a cannot play back the MP4 format content (MP4 video content) subjected to the conversion processing by itself (information processor 11a). However, because information processor 11a conducts communication with server 61a to check that the export can be performed, information processor 11a re-encrypts the plain text content (MP4 video content) in the MP4 format, and exports the plain text content to recording medium 40a or the built-in memory of mobile device 50a.

In this case, the MP4 video content exported to recording medium 40a or the built-in memory of mobile device 50a cannot directly be played back. Therefore, mobile device 50a accesses the right processing server to acquire the playback right data, which allows mobile device 50a to play back the MP4 video content exported to the built-in memory or recording medium 40a.

The operation of the playback player in the case that the flag (first flag) defined by the data name of Export_Playable indicates 1 will be described with information processor 11a in FIG. 9, which is an example of the playback player, as an example.

As described above, information processor 11a acquires the plain text content (MP4 video content) in the MP4 format from the TS video content of optical disk 21. In the case that information processor 11a conducts communication with server 61a acting as the export authentication server to check that the export can be performed, information processor 11a re-encrypts the plain text content (MP4 video content) in the MP4 format, and exports the MP4 video content to recording medium 40a or the built-in memory of mobile device 50a.

Then, because Export_Playable indicates 1, information processor 11a generates playback right information 1181 indicating that information processor 11a can play back the MP4 video content subjected to the conversion processing as default playback right data.

In order to generate playback right information 1181, information processor 11a generates the usage rule of playback right information 1181 by referring to the usage rule indicated by the conversion control information. For example, the values of the CCI and APSTB defined by the data names in the conversion control information of FIG. 16 are directly succeeded in playback right information 1181. Playback right information 1181 is subjected to processing of recording the key in order to be able to play back the MP4 video content. The key is encrypted using the device key held by the information processor 11a so as to be played back only in a specific device. For example, the key is a unit key used to encrypt the MP4 format content, and the key is encrypted using the device key in FIG. 14. The encrypted key (unit key) is recorded as a part of the playback right information.

The generated conversion control information can be stored in both the optical disk and the server on the network. In the case that the conversion control information is stored only in one of the optical disk and the server on the network, the conversion control information existing in one of the optical disk and the server on the network is used. In the case that the conversion control information is stored in both the optical disk and the server on the network, the conversion control information existing in the server on the network is preferentially used.

Therefore, in the case that the conversion control information different from that at a time point at which the optical disk is produced exists in the server on the network, information processor 11a can acquire the different conversion control information from the server on the network.

Therefore, information processor 11a can change the control method according to a user's reaction, or change the control method even after since a given period elapses the time point at which the optical disk is produced. In the case that a master (stamper) of the optical disk is produced all over the world, because the conversion control information on the server can be changed in each area, information processor 11a can perform the control according to each area.

FIG. 17 is a view illustrating another example of the detailed configuration of the conversion control information in the second exemplary embodiment.

In the conversion control information of FIG. 17, a check SFF permission server lag is added to the conversion control information in FIG. 16.

A flag defined by the data name of the check SFF permission server is a data item that is newly added in the second exemplary embodiment, and the flag is the second flag indicating whether server 61 checks the value of the first flag. For example, in the case that the flag defined by the data name of the check SFF permission server indicates 1, server 61 checks the value of the first flag irrespective of the value indicated by Export_Playable.

Even if the prohibition on the playback of the optical disk is indicated during the production of the optical disk (however, the necessity of the checking with the server is eliminated), information processor 11a can change the control method by changing the value of the conversion processing information held by the server.

Advantageous Effect of the Second Exemplary Embodiment

As described above, the information processing method for checking whether the file format of the content is correctly converted can be performed in the second exemplary embodiment.

Specifically, the conversion control information is acquired, whereby the MP4 video content converted from the MPEG2-TS scheme into the MP4 scheme can be played back by the information processor performing the conversion processing according to the intention of the content provider from the viewpoint of copyright protection. The information processor plays back the content converted into the MP4 scheme, which allows the user to check whether the conversion processing is correctly performed.

Even if the content provider prohibits the playback, the information processor can display such the proper user guidance message that the MP4 video content cannot be played back by acquiring the conversion control information. Therefore, the user can be prevented from being confused even if the information processor cannot play back the converted MP4 video content.

In Example 1, by way of example, the message indicating that the MP4 video content (export content) subjected to the conversion processing cannot be played back and checking whether the conversion processing is performed is produced as indicated by message 1190 in FIG. 9. Alternatively, a message enhancing the user guide function may be produced. In this case, an example will be described with reference to FIG. 18.

Figure 18:
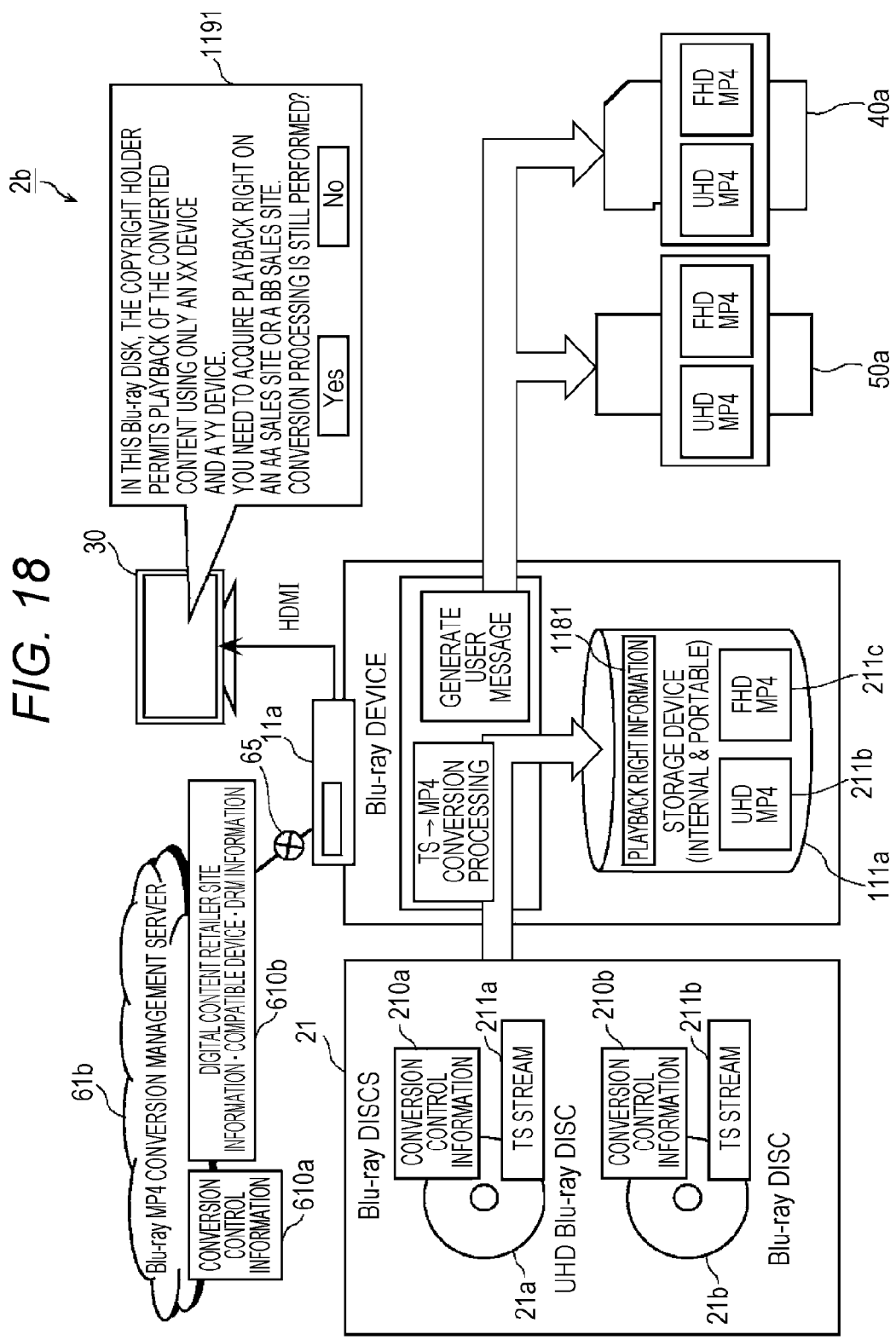
FIG. 18 is a view illustrating a system configuration example of production of a message in which a user guide function is enhanced in the second exemplary embodiment.

FIG. 18 is a view illustrating a system configuration example of production of a message in which a user guide function is enhanced in the second exemplary embodiment. The component similar to that in FIG. 9 is designated by the identical reference mark, and the detailed description is omitted.

System 2b in FIG. 18 differs from system 2a in FIG. 9 in produced message 1191. System 2b in FIG. 18 also differs from system 2a in FIG. 9 in the information managed by server 61b connected to information processor 11a. In FIG. 18, server 61b is a Blu-ray MP4 conversion management server, and server 61b manages right-related information 610b such as the digital content retailer site information, the compatible device, and the DRM information in addition to conversion control information 610a. The right-related information such as the digital content retailer site information, the compatible device, and the DRM information may be stored in optical disk 21.

In information processor 11a in FIG. 18, message generator 119 may produce message 1191 indicating a user guide menu in advance of the TS-MP4 conversion processing.

Therefore, a message in which the user guide function is enhanced can be presented to the user. For example, message 1191 indicates that "In this Blu-ray disk, the copyright holder permits the playback of the converted content using only an XX device and a YY device. You need to acquire the playback right on an AA sales site or a BB sales site. The conversion processing is still performed?".

Accordingly, in system 2b of FIG. 18, by the message in which the user guide function is enhanced, the user can learn that only the device that is not owned by the user is supported by the converted MP4 video content, or that the user is guided to the digital content retailer site that is not used by the user in advance of the conversion processing.

Sometimes the data-for-export file (additional data) is not stored depending on a kind of optical disk 21. In this case, information processor 11 acquires the data-for-export file from server 61. In this case, an example will be described below with reference to FIG. 19.

Figure 19:
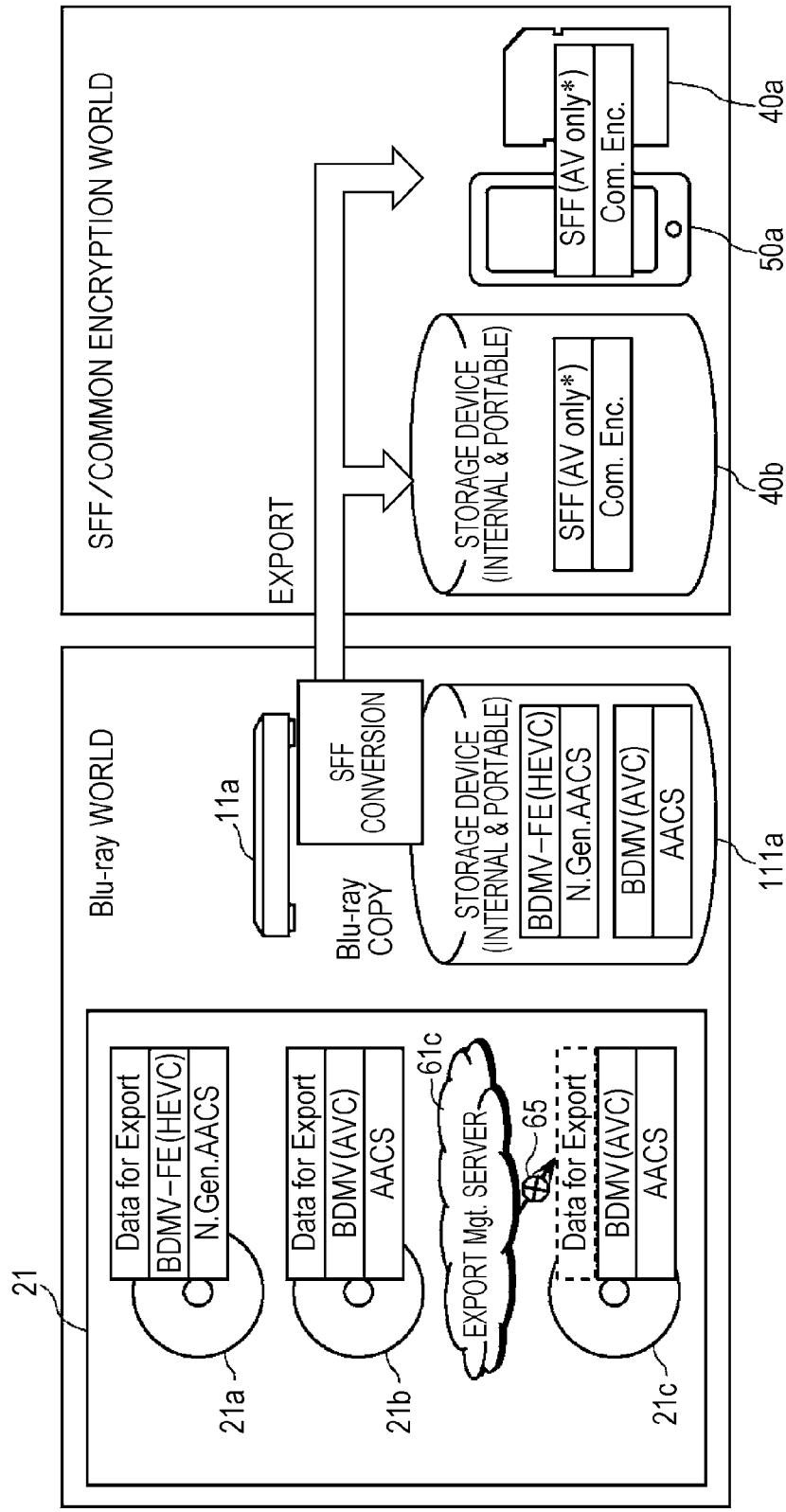
FIG. 19 is a view illustrating necessity for export data in SFF export processing.

FIG. 19 is a view illustrating necessity for export data in the SFF export processing. The component similar to that in FIGS. 9, 11, and 18 is designated by the identical reference mark, and the detailed description is omitted.

Types of the Blu-ray optical disks include a UHD Blu-ray disk, a new Blu-ray disk, and a legacy Blu-ray disk. Optical disk 21a in FIG. 19 is the UHD Blu-ray disk. In addition to the BDMV (Blu-ray Disk Movie) file, the export data file is stored in optical disk 21a. The BDMV is a kind of an application format used in the optical disk medium. The TS video content is recorded in the optical disk 21a in the BDMV. The export data file is the above data-for-export file, and is the additional data used in the export content. Optical disk 21c is the legacy Blu-ray disk, namely, the Blu-ray disk that is already sold in a market. Only the BDMV file is stored in optical disk 21c, while the export data file does not exist in optical disk 21c. Optical disk 21b is the new Blu-ray disk. In addition to the BDMV file, the export data file is stored in optical disk 21b.

A Blu-ray copy is a method for recording the data in the HDD in a Blu-ray disk format. In FIG. 19, the TS video streams included in optical disk 21a to optical disk 21c are directly stored in storage capacitance unit 111a. SFF conversion is a method for recording the data in an external recording medium by converting the data into the data in the SFF format that is of one of the MP4 formats. In FIG. 19, the TS video stream stored in storage capacitance unit 111a is converted into that in the MP4 format (SFF format), and the SFF format is exported to storage capacitance unit 111b, the built-in memory of mobile device 50a, or recording medium 40a (SFF export processing).

As described above with reference to FIG. 11, the AAC audio or subtitle that can be used in SFF (AV only) of the export content are required to perform the SFF export processing.

Because the data-for-export file of the export data file does not exist in optical disk 21b, it is necessary to store the export data file of optical disk 21b in server 61 such as an export management server. Therefore, information processor 11a can perform the SFF conversion by acquiring the data-for-export file of optical disk 21b from server 61.

That is, in the case that the additional data (data for export) that can be used in the export content is not stored in optical disk 21b, information processor 11a may further acquire the additional data (data-for-export file) of optical disk 21b from server 61 existing in external network 65. Information processor 11a may convert the acquired additional data into the meta-data (manifest file) used to explain the export content.

The information processing method, the information processor, and the recording medium according to one or more modes of the present disclosure are described above based on the exemplary embodiments. However, the present disclosure is not limited to the exemplary embodiments. Various modifications can be made without departing from the scope of the present disclosure, and a combination of the components of the different exemplary embodiments may also be included in one or the plurality of modes of the present disclosure. For example, the following cases are also included in the present disclosure.

(1) Specifically, each above device is a computer system including a microprocessor, a ROM, a RAM, a hard disk unit, a display unit, a keyboard, a mouse, and the like. A computer program is stored in the RAM or the hard disk unit. The microprocessor operates according to the computer program, whereby each device achieves its function. At this point, the computer program includes a plurality of combinations of command codes indicating an instruction to the computer in order to achieve a predetermined function.

(2) A part or whole of components constituting each above device may include one system LSI (Large Scale Integration). The system LSI is a super multi-functional LSI in which a plurality of components are integratedly produced on one chip, specifically, is a computer system including the microprocessor, the ROM, the RAM, and the like. The computer program is stored in the RAM. The microprocessor operates according to the computer program, whereby the system LSI achieves its function.

(3) A part or whole of components constituting each above device may include an IC card detachably attached to the device or a single module. The IC card or the module is a computer system including the microprocessor, the ROM, the RAM, and the like. The IC card or the module may include the super multi-functional LSI. The microprocessor operates according to the computer program, whereby the IC card or the module achieves its function. The IC card or the module may have a tamper-resistant property.

(4) The present disclosure may be the methods described above. The present disclosure may be the computer program that causes a computer to perform these methods, or the digital signal including the computer program.

(7) In the present disclosure, the computer program or the digital signal may be recorded in a computer-readable recording medium such as a flexible disk, a hard disk, a CD-ROM, an MO, a DVD, a DVD-ROM, a DVD-RAM, a BD (Blu-ray disk), and semiconductor memory. The present disclosure may be the digital signal recorded in recording medium.

(5) In the present disclosure, the computer program or the digital signal may be transmitted through an electric communication line, a wireless or wired communication line, a network typified by the Internet, data broadcasting, and the like.

(6) The present disclosure may be the computer system including the microprocessor and the memory, the computer program may be stored in the memory, and the microprocessor may operate according to the computer program.

(7) The program or the digital signal is transferred while recorded in the recording medium, or the program or the digital signal is transferred through the network, whereby the program or the digital signal may be performed by another independent computer system.

(8) The exemplary embodiments and modifications may be combined.

(9) For example, the technology described in the above modes can be implemented by the following typical cloud service. However, the implementation of the technology described in the above mode is not limited to typical cloud service.

The present disclosure can be used in the information processing method, the information processor, and the recording medium, particularly in the information processing method, the information processor, and the recording medium for converting the format of the content recorded in the recording medium into the export format, such as the processing of converting the MPEG2-TS scheme into the MP4 scheme.

What is claimed is:

1. An information processing method used in an information processing terminal, comprising:
    holding a device key provided to the information processing terminal;
    reading encrypted content and conversion control information from a recording medium, the conversion control information indicating a usage rule of the encrypted content being stored in the recording medium, and the conversion control information including a first flag indicating whether the information processing terminal can play back an export content;
    decoding the read encrypted content using the held device key to obtain a decoded content;
    converting the decoded content into an export format to obtain the export content;
    controlling whether playback right information indicating that the information processing terminal can play back the export content can be generated or not, according to the first flag included in the read conversion control information;
    generating the playback right information when the controlling judges that the playback right information can be generated, the playback right information being subjected to a processing of recording a unit key in order to be able to play back the export content; and
    when the controlling judges that the playback right information cannot be generated, not generating the playback right information.

2. The information processing method according to claim 1, further comprising exporting the export content.

3. The information processing method according to claim 2, wherein the first flag is expressed by 1 bit, and defined by a data name of Export_Playable.

4. The information processing method according to claim 3, further comprising generating a message,
    wherein, for the first flag of 0 (zero), in the controlling, a control is performed such that the playback right information cannot be generated in the generating of the playback right information, and
    the message indicating that the information processing terminal cannot play back the export content is generated in the generating of the message.

5. The information processing method according to claim 2,
    wherein, for the first flag of 1, in the controlling, a control is performed such that the playback right information can be generated in the generating of the playback right information, and
    in the exporting, the export content and the playback right information are exported to a mobile device or a portable storage medium.

6. The information processing method according to claim 1,
    wherein additional data corresponding to the export content is stored in the recording medium, and
    in the converting, the additional data is converted into a manifest file in which information on the export content is described.

7. The information processing method according to claim 1, further comprising
    acquiring additional data for the recording medium from a server existing in an external network when the additional data is not stored in the recording medium, the additional data being configured to be used in the export content,
    wherein, in the converting, the acquired additional data is converted into meta-data used to explain the export content.

8. The information processing method according to claim 1,
    wherein the encrypted content is stored in a Moving Picture Experts Group Phase 2-Transport Stream (MPEG2-TS) format in the recording medium, and
    in the converting, an MPEG2-TS format content decoded in the decoding is converted into the export file in a Moving Picture Experts Group-4 (MP4) format.

9. An information processor, comprising: one or more memories; and circuitry which, in operation, performs:
    holding a device key provided to the information processor;
    reading encrypted content and conversion control information from a recording medium, the conversion control information indicating a usage rule of the encrypted content being stored in the recording medium, and the conversion control information including a first flag indicating whether the information processing terminal can play back an export content;
    decoding the read encrypted content using the held device key to obtain a decoded content;
    converting the decoded content into an export format to obtain the export content;
    controlling whether playback right information indicating that the information processor can play back the export content can be generated or not, according to the first flag included in the read conversion control information;
    generating the playback right information when the controlling judges that the playback right information can be generated, the playback right information being subjected to a processing of recording a unit key in order to be able to play back the export content; and
    when the controlling judges that the playback right information cannot be generated, not generating the playback right information.

10. A non-transitory computer-readable recording medium, in which an encrypted content is recorded and conversion control information indicating a usage rule of the encrypted content is stored,
    wherein the conversion control information includes a flag indicating whether an export content can be played back by an information processing terminal that performs export of the encrypted content,
    wherein the flag is used to determine whether playback right information indicating that the information processing terminal can play back the export content can be generated or not, and
    wherein the playback right information is subjected to a processing of recording a unit key in order to be able to play back the export content.

* * * * *